US012627650B2

(12) United States Patent (10) Patent No.: US 12,627,650 B2
Zhang et al. (45) Date of Patent: May 12, 2026

(54) APPARATUSES, COMPUTER-IMPLEMENTED METHODS, AND COMPUTER PROGRAM PRODUCTS FOR PROVISIONING EMBEDDED APPLICATION ACCESS

(71) Applicant: Atlassian PTY LTD., Sydney (AU)

(72) Inventors: David Zhang, Foster City, CA (US); Corina Lawu, Foster City, CA (US); Robert Scott Wedell, Austin, TX (US); Jiangyue Zhu, Fremont, CA (US); Lyubo Marinov, Mountain View, CA (US)

(73) Assignee: Atlassian PTY LTD., Sydney (AU)

( * ) Notice: Subject to any disclaimer, the term of this patent is extended or adjusted under 35 U.S.C. 154(b) by 197 days.

(21) Appl. No.: 18/478,377

(22) Filed: Sep. 29, 2023

(65) Prior Publication Data

US 2025/0112911 A1 Apr. 3, 2025

(51) Int. Cl.
*H04L 9/40* (2022.01)
*G06F 9/54* (2006.01)

(52) U.S. Cl.
CPC ............ *H04L 63/083* (2013.01); *G06F 9/541* (2013.01)

(58) Field of Classification Search
CPC ............................... H04L 63/083; G06F 9/541
See application file for complete search history.

(56) References Cited

U.S. PATENT DOCUMENTS

| | | | | |
|---|---|---|---|---|
| 10,986,504 B1 * | 4/2021 | Smith | ................. | H04W 12/068 |
| 11,044,348 B1 * | 6/2021 | Cannon-Brookes | ......................... | |
| | | | | G06F 21/629 |
| 12,136,066 B2 * | 11/2024 | Lalwani | ................. | H04L 63/10 |
| 12,182,000 B2 * | 12/2024 | Marinov | ................. | G06F 9/451 |
| 2017/0048222 A1 * | 2/2017 | Wise | ................. | G06F 16/24578 |
| 2019/0065763 A1 * | 2/2019 | Berg | ................. | G06F 21/6209 |
| 2021/0409402 A1 * | 12/2021 | Tulshibagwale | .... | H04L 63/0892 |
| 2022/0405462 A1 * | 12/2022 | Nahum | ................. | G06F 16/954 |

* cited by examiner

*Primary Examiner* — Dhairya A Patel

(74) *Attorney, Agent, or Firm* — Alston & Bird LLP

(57) ABSTRACT

Embodiments of the present disclosure provide improved embedding of an application within another application. Specifically, embodiments provide improved interoperability mechanisms supporting such embedding utilizing access to a storage access API. The storage access API in some embodiments provides a particular user-facing application access associated with a first application to particular shared cookie(s) or other data utilized to access functionality of an embedded application from within the user-facing application. Embodiments additionally or alternatively account for security barriers or security requirements of applications and/or supporting applications, for example browser applications, that facilitate the access to the embedded application from within the user-facing application associated with the user-accessed application by utilizing a credential-based access component.

20 Claims, 7 Drawing Sheets

APPARATUSES, COMPUTER-IMPLEMENTED METHODS, AND COMPUTER PROGRAM PRODUCTS FOR PROVISIONING EMBEDDED APPLICATION ACCESS

TECHNICAL FIELD

Embodiments of the present disclosure generally relate to interoperability between applications, and specifically to enabling embedded access of an application via a storage access API data flow.

BACKGROUND

Discrete software applications are generally designed to enable specific features and functionality without regard to robust principles of data interoperability. Accordingly, discrete software applications are often designed to create and maintain dedicated data repositories that are configured to be populated and updated via specifically designed protocols. Such design implementations often result in "siloing" of software applications. Attempts to merge software applications, however, suffer from various difficulties due to the independent operation of such applications for data security and data storage access.

Applicant has discovered various technical problems associated with conventional software application integration. Through applied effort, ingenuity, and innovation, Applicant has solved many of these identified problems by developing the embodiments of the present disclosure, which are described in detail below.

BRIEF SUMMARY

The appended claims serve as a summary of the disclosure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
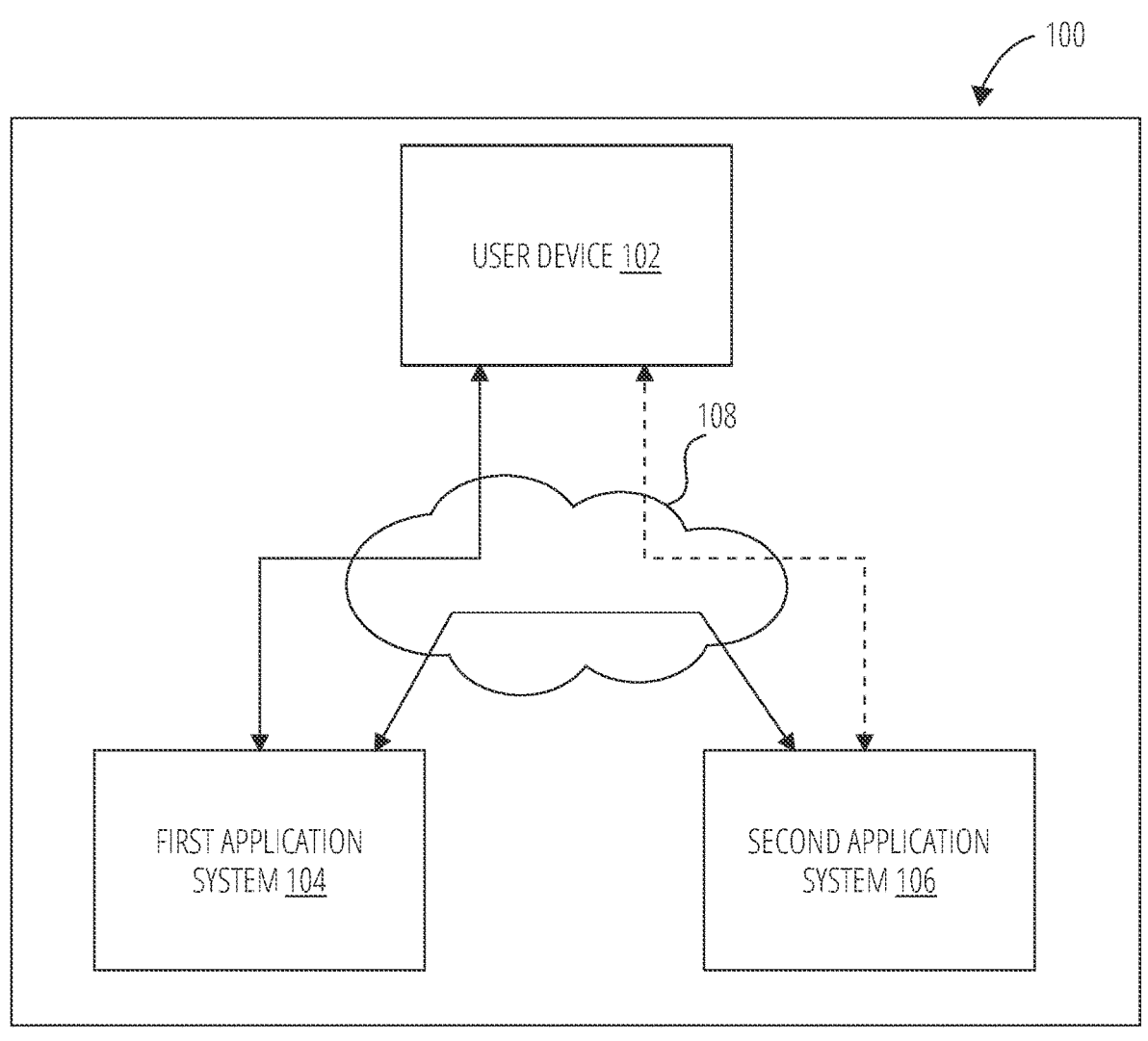
FIG. 1 illustrates an example system within which embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Software applications exist in a myriad of configurations and form-factors having varying levels of interoperability. For example, a software application may be developed having a particular set of features in mind, such that the software application is configured to perform an array of operations to support each feature of the set of desired features.

In certain circumstances, it may be desirable to develop software applications that enable interactions with one or more other software applications. For example, a first software application may be designed to call, or retrieve data from, a second software application to accomplish various tasks or operations. Such interactions are especially useful in circumstances where the first software application and the second software application have a common owner, are provided in or otherwise part of a common software suite or tool kit, and/or otherwise where use of the second software application is to be incentivized.

Efforts to achieve seamless software application interactions or true interoperability can create technical challenges and user experience issues. For example, if a second software application follows modern security protocols to avoid malicious, unintended, or otherwise unauthorized access, the first software application may have limited or no direct access to the second software application. Further, other security restrictions or configurations of the first software application or related supporting applications utilized for embedding of the second software application within the first application, for example a browser application supporting an iframe embedded in the first software application, may prevent conventional direct access to the second software application. In this regard, such restrictions or configurations may entirely prevent access to the second application functionality, or intermittently prevent access causing user experience degradation, when access is attempted utilizing conventional methodologies usable in non-embedded access of the second software application, Interoperability-based technical problems are particularly acute in circumstances where each of the first software application and the second software applications require authentication and validation of different user access credentials, or otherwise independent validation of user access credentials. Credential management software applications attempt to address such problems, but they necessarily introduce a third software application into the mix, which tends to compound interoperability complexities. Such complexities are compounded even further in circumstances where the implementations supporting the embedding of the second application prevent the first software application from directly accessing the second software application.

Further interoperability-based problems arise when the second software application is primarily designed to provide features via direct access itself or to other software applications in a manner not originally intended through embedding. For example, if a second software application is configured to provide access to functionality via direct access by a browser application, the same access mechanisms may be blocked or otherwise face security barriers if attempted for use to provide embedded access to such functionality. Similarly, any mechanisms that provide a native application corresponding to the second software application (e.g., a local application executed on the end user device) access to such functionality may similarly face security barriers that prevent use of such mechanisms for access in an embedded context. Such mechanisms that are entirely in control of the second software application may suffer from authentication difficulties, data access difficulties, and/or more.

Additional technical problems are created because in most cases a first software application is not provisioned to trigger specific user-facing functions or operational workflows of a second software application based on user engagement within a user interface of the first software application. Users must be jettisoned to an external software application in order to trigger desirable functions or features of the second software application. Such limitations preclude the first software application from having access to any actions, data, or operations performed by or within the second software application, thereby eliminating any possibility of effective cooperation and collaboration of the two software applications in support of any particular user goals.

Each of these deficiencies leads conventional multi-app implementations to operate in a manner that is inefficient and/or otherwise ineffective. Providing efficient, consistent, and effective interoperability between a first software application, a second application, and possibly a variety of other software applications, using an effective framework that enables reciprocal native data access, data updates, and data persistence, where appropriate, is desirable. Additionally, effective and robust mechanisms other than conventional direct access between applications (which may be impossible or impractical in contexts of embedding a second application in the first application) that facilitate data communications and other interoperability is similarly desirable.

Embodiments of the present disclosure address the various deficiencies set forth above and others described herein. In some embodiments, a user-accessed application (e.g., Trello® by Atlassian®) is provided including or otherwise associated with an embedded application (e.g., Confluence® by Atlassian®) with which the user-accessed application may interact. Access to the embedded application is established through use of a storage access API that facilitates at least an initial data-driven connection. In this regard, the storage access API is leveraged in a manner that utilizes supporting application functionality, such as that of a browser application utilized to embed the embedded application within a user-facing application corresponding to the user-accessed application, to establish and/or maintain a data-driven connection. The result is an established data-driven connection that, once established, enables functionality of the embedded application to be performed via the user-accessed application. The user-accessed application operates as, at least in part, a back-end and is hosted by a server. The user-accessed application includes or otherwise is configured to communicate with and otherwise support a corresponding user-facing application (e.g., a client-side Trello® app) that operates as a front-end at the client or user device. In various embodiments, a user may access functionality of both the user-accessed application and the embedded application via the user-facing application corresponding to the user-accessed application as a single point of interaction, such as to avoid requiring independent switching and access to a second user-facing application corresponding to the embedded application.

Usage of the storage access API to establish a connection between the user-accessed application and the embedded application s various technical advantages, improvements, and addresses one or more of the technical problems described herein. In some embodiments for example, the user-accessed application employs particular methodologies for deploying access to the storage access API corresponding to the embedded application via the user-facing application corresponding to the user-accessed application. In this regard, such embodiments utilize such mechanisms to ensure provisioning of access to the storage access API from by the user-accessed application while circumventing possible security barriers and/or other application barriers that would prevent conventional access to the embedded application upon embedding. Once accessed, the storage access API may be utilized to establish a data-driven connection utilized for subsequent retrieval of data from and/or transmission of data to the embedded application.

In one example, a user that utilizes the user-accessed application (e.g., Trello®) to access both data and functionality of the user-accessed application together with data and functionality of an embedded application (e.g., Confluence®) is provided a single interaction point. User engagement of such interaction point, e.g., a user-facing application such as a client-side Trello® app, enables access to create and update data objects (e.g., cloud or server-side Trello® data structures) of the user-accessed application and embedded application data objects (e.g., cloud or server-side Confluence® data structures) of the embedded application. Any data object and/or embedded application data object creations or updates are stored and persisted in a manner that is accessible to the user-accessed application and the embedded application respectively. As a result, a user may later directly access the embedded application (e.g., via a separate user-facing application supported by the embedded application such as a client-side Confluence® app) and pick up where they left off based on the updated state of the embedded application data objects.

Upon startup or another trigger during access of the user-facing application, for example upon accessing a particular interface in which the embedded application is accessible, the user-accessed application may utilize the storage access API to establish a data-driven connection with the embedded application. A software application supporting the embedding, for example a browser application utilized to embed an embedded interface associated with accessing the embedded application from within the user-facing application, may provide a particular storage access API to enable separate data access and/or storage for various web applications. The user-facing application may, via the embedded interface, provide a particular flow utilizing credential-based access components and/or other specially configured user interfaces that enables input of particular data in a manner that configures shared access of data via the storage access API. Once access to the storage access API is established, the storage access API may be utilized to configure a data-driven for authorized use corresponding to a particular user. Accordingly, embodiments of the present disclosure provide mechanisms that enable consistent and robust access to the storage access API for the embedded application from within a user-facing application corresponding to a user-accessed application. Additionally, embodiments of the present disclosure provide mechanisms for using the storage access API to establish a data-driven connection that enables the user-accessed application to perform transmitting of data to the embedded application and/or receiving of data from the embedded application.

Definitions

"Authentication success data" refers to electronically managed data representing user input indicating authentication to access a storage access API associated with validated or otherwise authenticated user credentials associated with particular functionality of an application. Non-limiting examples of authentication success data includes data indicating that a user triggers closing of a top level domain interface (e.g., a credential-based access component) via which a storage access API for a particular application is accessed to store data utilized for access by another application and/or via which access to the storage access API for the particular application is authorized or otherwise permissioned for another application (e.g., a user-accessed application accessing a storage access API corresponding to an embedded application).

"Browser application" and "browser" refer to any software application that provides access to at least one web application and/or applet.

"Browser-prompted access request" refers to electronically managed data generated by a browser application that requests user-granted permission for a particular one-time or ongoing action.

"Browser-specific" refers to a state of operation that is specific to a particular browser application or classification of browser applications. In some contexts, a first browser application and a second browser application have browser-specific differences in functionality, layout, design, and/or other configurations.

"Credential-based access component" refers to a renderable user interface, or sub-interface, that facilitates permissions for accessing a storage access API associated with an embedded application. In some embodiments, a credential-based access component stores embodies a top level domain instance that facilitates storage of data to a storage access API and/or configuring of permissions for accessing the storage access API from within a user-facing application associated with a user-accessed application. A credential-based access component embodies a separate instance from a first instance supporting an embedded interface, and the credential-based access component embodies a top level domain for purposes of access via a supporting application (e.g., a browser application) A credential-based access component is renderable as a modal, popup window, or otherwise as a separate renderable interface above or simultaneous with an embedded interface within a user-facing application associated with a user-accessed application.

"Determination procedure" refers to a computer-implemented process performed by an application that checks whether access to a particular data resource or endpoint is authorized.

"Embedded" with respect to a particular application refers to a combination of functionality and corresponding user interface elements presented from within an instance of a second application. In some embodiments, such separate applications are associated with a different set of provisioned user accounts, such that functionality made available via embedding is controlled by each of the separate applications from within the user-accessed application as described herein, including user account authentication, data management, interface element generation, layout, and/or configuration, and/or associated functionality all performed from within a sub-interface of the user-accessed application.

"Embedded application" refers to an executable code base that performs a particular second set of functions and is configured to be accessed at least through a user-facing application associated with a user-accessed application associated with a separate executable code base from that of the embedded application. An embedded application is associated with a second set of user accounts that are provisioned to enable access to the functionality provided by the embedded application, some of which are provisioned for accessing functionality of the user-accessed application as well such that a user must authenticate a session associated with a user-account provisioned as a user-accessed app user account and an embedded app user account to access functionality of the embedded application from within a user-facing application associated with the user-accessed application. In some embodiments, an embedded application is accessible directly as well as through a user-accessed application, and/or one or more additional and/or alternative functions is accessible through the embedded application when accessed directly rather through a user-accessed application.

"Embedded application data object" refers to electronically managed data representing information maintained by an embedded application. The embedded app data object includes information utilized for any of a myriad of functions provided by the embedded application, metadata associated with the data object, and/or metadata associated with the user account that generated the embedded app data object. A user-accessed application utilizes a data-driven connection to access one or more embedded app data object(s), and/or portions of information thereof, for providing via the user-accessed application.

"Embedded application functionality" refers to functionality provided by an embedded application.

"Embedded application interface element" refers to an interface element depicting data from or otherwise associated with embedded application functionality.

"Embedded interface" refers to a user interface associated with accessing functionality of an embedded application, where the interface is rendered within another user interface associated with a user-accessed application. In some embodiments an embedded interface includes a wrapper component that supports an embedded sub-interface associated with an embedded application, for example a specially configured iframe.

"Functionality" refers to one or more software-driven processes and/or actions that may be initiated via a particular application. In some embodiments, a functionality of a particular application is separated into full functionality provided to a first set of users and/or user accounts (e.g., those that have fully provisioned user accounts associated with the application), and limited functionality provided to a second set of users and/or user accounts (e.g., those that have not provisioned a user account associated with the application or that had a limited user account automatically provisioned by a user-accessed application).

"Integrated interface" refers to a user interface comprising at least one sub-interface associated with user-accessed application functionality and at least one sub-interface associated with embedded application functionality.

"Interface element" refers to any control, label, image, text, and/or other visual element renderable within a user interface.

"Login state" refers to electronically managed data indicating whether a user account is currently validated for an authenticated session associated with a particular application.

"Re-loading" refers to re-accessing and/or re-requesting a resource or other functionality via a particular interface.

"Requested embedded application functionality" refers to a particular subset of embedded application functionality that was requested in response to a user input.

"Shared cookie" refers to first-party web or other first-party application cookie data that is accessible via a storage access API by a third-party application.

"Storage access API" refers to a software-driven environment that provides cross-party content sharing between third party managed contexts in a browser application. A storage access API provides access to a secure storage that individually manages different first-party cookies for any number of applications.

"User credentials" refers to electronically managed data that is usable to associate a user with a particular user account of an application. Non-limiting examples of user credentials includes a username and password combination.

"User input" refers to any electronically managed data representing a user engagement with a computing device. Non-limiting examples of user input include a user-entered touch, mouse movement, mouse click, keyboard press, gesture, voice command, device movement, and/or peripheral input.

"User interface" refers to any renderable data outputted via a display or one or more output devices.

"User-accessed application" refers to a first executable code base that performs a particular first set of functions and is configured to provide a second set of functions associated with an embedded application embodied by a second executable code base through interaction with a data-driven connection associated with the embedded application. Via the data-driven connection, the user-accessed application enables a user to access functionality of the embedded application without requiring a user to have fully provisioned an embedded app user account corresponding to the embedded application. In some embodiments, the user-accessed application is associated with a first set of user accounts that are provisioned as user-accessed app user accounts to enable access the functionality provided by the user-accessed application, such that a user must authenticate a session associated with a user-accessed app user account before accessing functionality provided by the user-accessed application.

"User-accessed application functionality" refers to functionality provided by a user-accessed application.

"User-accessed application interface element" refers to an interface element depicting data from or otherwise associated with user-accessed application functionality.

"User-facing application" refers to computer-coded instructions, an executable code base, and/or a software application that is configured for execution and/or access via a user device to enable the user to interact with functionality provided by at least one remote executable code base. In some embodiments, a user-facing application serves as a client device that provides access to functionality provided by an application server. A server-side application providing various functionality is associated with a user-facing application that is installed to, and/or otherwise executed via, the user device to enable a user of the user device to access the various functionality via interaction with the user device. Separate user-facing applications may be made available for directly accessing separate remote executable code bases, for example to access separate remote application servers. Non-limiting examples of a user-facing application include a native software application downloadable to a user device (e.g., via an "app store," directly from the Internet, and/or the like) that communicates with a remote application server, and a web-based application accessible via a browser application installed and/or executable on the user device.

Example Systems and Apparatuses of the Disclosure

FIG. 1 illustrates an example system within which embodiments of the present disclosure may operate. Specifically, FIG. 1 depicts an example system 100. The example system 100 includes a user device 102, first application system 104, and second application system 106. One or more of the user device 102, first application system 104, and/or second application system 106 are communicable over one or more communication channels, for example, including the communications network 108.

In some example contexts, each of first application system 104 and second application system 106 includes any number of various computing devices that maintain one or more particular software applications. In some embodiments, for example, each of the first application system 104 and/or second application system 106 includes one or more one or more servers, one or more sub-servers, one or more databases, one or more network connections facilitating a communication network between such devices, and/or the like. In some such embodiments, all components of the first application system 104 are located in the same proximate location, for example in a particular data warehouse and/or other location owned or otherwise under the control of the entity that controls a first application corresponding to the first application system. In other embodiments, one or more component(s) of the first application system 104 is/are remotely located, for example one or more "cloud" computing device(s), one or more remote database(s), and/or the like. Each of the first application server 104 and the second application server 106 may be specially configured via hardware, software, firmware, and/or a combination thereof, to operate in a specific manner, provide particular functionality, and/or the like.

For example, in some embodiments the first application system 104 maintains and/or otherwise is configured to provide and/or support a first application, such as a user-accessed application as described herein. In this regard, in some embodiments the first application system 104 configures, provides, and/or otherwise causes rendering of user interfaces, web pages, and/or other specially configured visual and data elements that enable a user to view relevant data controlled by the first application system 104 and/or interact with functionality for managing such data. In other embodiments, the first application system 104 serves as a back-end computing system that provides particular data objects, enables access to particular processing actions, and/or otherwise perform certain functionality to a user of an external user-facing application (e.g., accessed via the user device 102 as described herein). The first application system 104 is, in some embodiments, configured by specific computer-coded instructions embodying a first code base that are executed by computing hardware of the first application system 104, such as a memory device storing at least such computer-coded instructions in conjunction with at least one processor that executes the computer-coded instructions. Additionally or alternatively, in some embodiments, the first application of the first application system 104 is supported at least in part by a user-facing application on the user device 102. It should be appreciated that the first application system 104 may be configured to perform any of a myriad of computing functionality and is not restricted to one particular kind of application, software, computing language, implementation details, and/or the like.

The second application system 106 may similarly maintain and/or otherwise is configured to provide and/or support a second application, for example an application for embedding (referred to as an embedded application). In this regard, in some embodiments the second application system 106 is controlled by the same entity as the first application system 104, for example where the second application is a second software application of a software suite of tools each owned by the same entity. In some such embodiments, however, the first application system 104 and the second application system 106 may be remote from one another or centrally located. For example, in some embodiments, the first application system 104 includes devices at a first location or set of locations, and the second application system 106 include devices located at a second location or set of locations. It should be appreciated that one or more of the devices may be located at the same location, and others located remotely from one another. Additionally or alternatively, in some embodiments the first application system 104 and/or second application system 106 share one or more computing devices. In one particular example context, the first application system 104 and second application system 106 share an authentication server that performs at least user authentication with respect to one or more provisioned user accounts for one or more particular software applications.

In other embodiments, the first application system 104 and the second application system 106 are embodied at least partially by the same computing device(s). For example, in some embodiments, the first application system 104 is embodied by a first virtual server and the second application system 106 is embodied by a second virtual server. Each of the virtual servers may be controlled by different computing devices and/or the same computing device. For example, in some embodiments, the same one or more computing device is configured to access and/or otherwise execute separate code bases embodying the first application and the second application utilizing the same hardware components such as the same memory/memories, displays, processors, and/or the like.

In one example context, the first application facilitated via the first application system 104 and the second application facilitated via the second application system 106 provide distinct but related functionality. For example, the first application system 104 may provide local and/or cloud-based dynamic workflow and task planning between any number of users (e.g., Trello® by Atlassian). In this regard, for example the first application in one particular context maintains data object(s) that organize a set of tasks, for example such that the first application enables creation and/or organization of the tasks by a user, management of created tasks by the user, modification of information associated with tasks by the user, marking as completed the tasks of the user, and/or to share specific tasks and/or sets of tasks with other user accounts representing other users of the first application.

The second application system 106 may provide local and/or cloud-based dynamic page management (e.g., Confluence® by Atlassian). In this regard, for example, the second application in one particular context maintains data objects that organize structured electronic documentation, include text and/or image files or combinations thereof, web-pages, and/or the like, for example, such that the second application enables creation and/or organization of the structured electronic documentation, management of created electronic documentation by the user, modification of information associated with the various electronic documentation, and/or to share specific electronic documentation and/or sets of electronic documentation with other user accounts representing other users of the second application.

In certain contexts, such as where the functionality and/or data objects of a first application are related the functionality and/or data objects of a second application, the first application system 104 and/or the second application system 106 may be configured to operate in conjunction with one another via a data-driven connection as described herein. For example, in some embodiments, the data-driven connection is embodied by a library of software application programming interfaces, software applications, and/or the like, accessible to the first application system 104, and/or a corresponding user-facing application executing on the user device 102, that provides access to the functionality of the second application. The data-driven connection may include application programming interfaces maintained by the embedded application and made accessible upon authentication of a particular user provisioned to access the embedded application. In some embodiments the data-driven connection is established via accessing a storage access API maintained by or otherwise associated with the embedded application, for example where the storage access API is provided by a browser application supporting embedding of the embedded application in a user-facing application associated with the user-accessed application.

In some example contexts, the user device 102 includes any one or more computing device embodied in hardware, software, firmware, and/or any combination thereof. It should be appreciated that the user device 102 may maintain and/or otherwise be configured to execute any number of software application(s) downloaded by, installed to, and/or otherwise accessible to the user device 102. For example, in some embodiments, the user device 102 includes and/or otherwise maintains an executable for a user-facing application associated with the first application system 104, for example where the user-facing application provides functionality provided by the first application system 104. Additionally or alternatively, in some embodiments, the user device 102 includes and/or otherwise maintains a browser application that enables access to the web and/or to a web-application that provides functionality provided by an accessed web server, such as via the first application system 104 and/or second application system 106. Additionally or alternatively, in some embodiments the browser application supports embedding of an embedding application and/or provision of credential-based access components within the user-facing application corresponding to the user-accessed application of the first application system 104. In some embodiments, the user device 102 further includes any number of additional applications, such as a second user-facing application that provides functionality associated with the second application system 106.

In some example embodiments, the user device 102 is configured to execute a user-facing application that provides direct access to functionality of the user-accessed application, which may further provide indirect access to functionality associated with an embedded application, as described herein. In at least one example context, for example, the user-facing application associated with the first application system 104 in conjunction with data and/or functionality provided by the first application system 104 embodies the user-accessed application, and the user-accessed application provides access to functionality of an embedded application associated with the second application system 106, such that at least some functionality provided by the second application system 106 is accessible from within the user-accessed application.

In some embodiments, in the context where the user-accessed application is associated with the first application system 104, the user device 102 accesses and/or otherwise performs user-accessed application functionality via communication with the first application system 104. In this regard, in some embodiments the user of the user device 102 establishes a secure session with the first application system 104, for example by authentication information with the first application system 104 to initiate a secured session associated with a particular user account provisioned for accessing the first application system 104. In this regard, the authenticated session may be linked to and/or otherwise associated with the identified user account corresponding to the first application (e.g., a user-accessed application account) for use in identifying data associated with the particular authenticated user-accessed application account, store data and/or modify data associated with the user-accessed application account as the user performs various actions, and/or the like.

In some example contexts where the second application associated with the second application system 106 embodies the embedded application, the user device 102 may communicate with one or more servers to provide embedded application functionality. For example, in some embodiments, the user-accessed application embodied by or corresponding to a user-facing application executing and/or otherwise accessed on the user device 102 provides a data-driven connection that enables access to the embedded application (e.g., the embedded application functionality provided by the second application system 106 in the example context). In some embodiments, the user-accessed application (e.g., embodying the first application) configures the data-driven connection utilizing a storage access API associated with the embedded application (e.g., embodying the second application), for example supported by a browser application leveraged by a user-facing application corresponding to the user-accessed application. In this regard, the first application system 104 may cause rendering (e.g., to the user device 102 via the user-facing application) of an integrated interface that enables access to both first application functionality and second application functionality. In some such embodiments, the data-driven connection enables communication directly between the user device 102 and the second application server 106.

In yet other embodiments, the data-driven connection enables communication indirectly between the user device 102 and the embedded application (for example, facilitated via the second application system 106) via an intermediary computing device. For example, in some embodiments, the user device 102 communicates with the first application system 104 in a manner specially configured to cause the first application system 104 to communicate with the second application system 106 and provide the response data provided by the second application system 106 back to the user device 102 in circumstances where the response is not directly transmitted. For example, in some embodiments, the first application system 104 serves as a data-driven connection for enabling access to the embedded application functionality provided by the second application system 106.

Each of the computing devices embodying the user device 102, first application system 104, and/or second application system 106, is communicable with one another over one or more communication network(s). For example, in some embodiments, each of the computing devices communicates over the communications network 108. In some example contexts, the communications network 108 is embodied by one or more network access points, relays, base stations, data transmission devices, cellular communication towers, and/or other communication devices embodying a public network such as the Internet. Additionally or alternatively, in some embodiments, the communications network 108 includes one or more computing devices of a user's local network, for example one or more network access point(s) such as a modem and/or router that enable access to a public network. It should be appreciated that the user device 102 communicates over the communications network 108 via any of a myriad of communication mechanisms, including without limitation a wired connection, a Wi-Fi connection, a cellular connection, and/or the like.

It should be appreciated that, in some embodiments, a single entity controls any number of application servers associated with a suite of associated software tools. For example in some embodiments, each application server is associated with or otherwise a part of a federated network and database platform, such that the various application servers of the federated network and database platform embody an associated suite of software tools. In some such embodiments, one or more aspects of various application servers may be embodied by a separate system that performs such functions for each of the associated application servers. For example, in some embodiments, the application servers are each associated with a shared authentication server that performs user authentication associated with one or more user accounts for each application embodied by an application server of the federated network and database platform. In other embodiments, different application servers for each application embody independent authentication servers.

It should be appreciated that, in some embodiments, a single user-accessed application is associated with multiple embedded applications. In this regard, a single user-facing application associated with a user-accessed application provides access to functionality associated with each of the multiple embedded applications together with functionality associated with the user-accessed application. In some such embodiments, a single user-accessed application supported by one or more application systems may be configured to provide access to multiple embedded applications embodied by and/or facilitated by multiple other application servers. For example, the application servers associated with the user-accessed application may communicate with the other application servers associated with each embedded application to provide access to functionality associated with each embedded application. In some embodiments, a user-facing application associated with the user-accessed application utilizes a storage access API to establish a data-driven connection with each embedded application independently or simultaneously with multiple embedded applications.

Figure 2A:
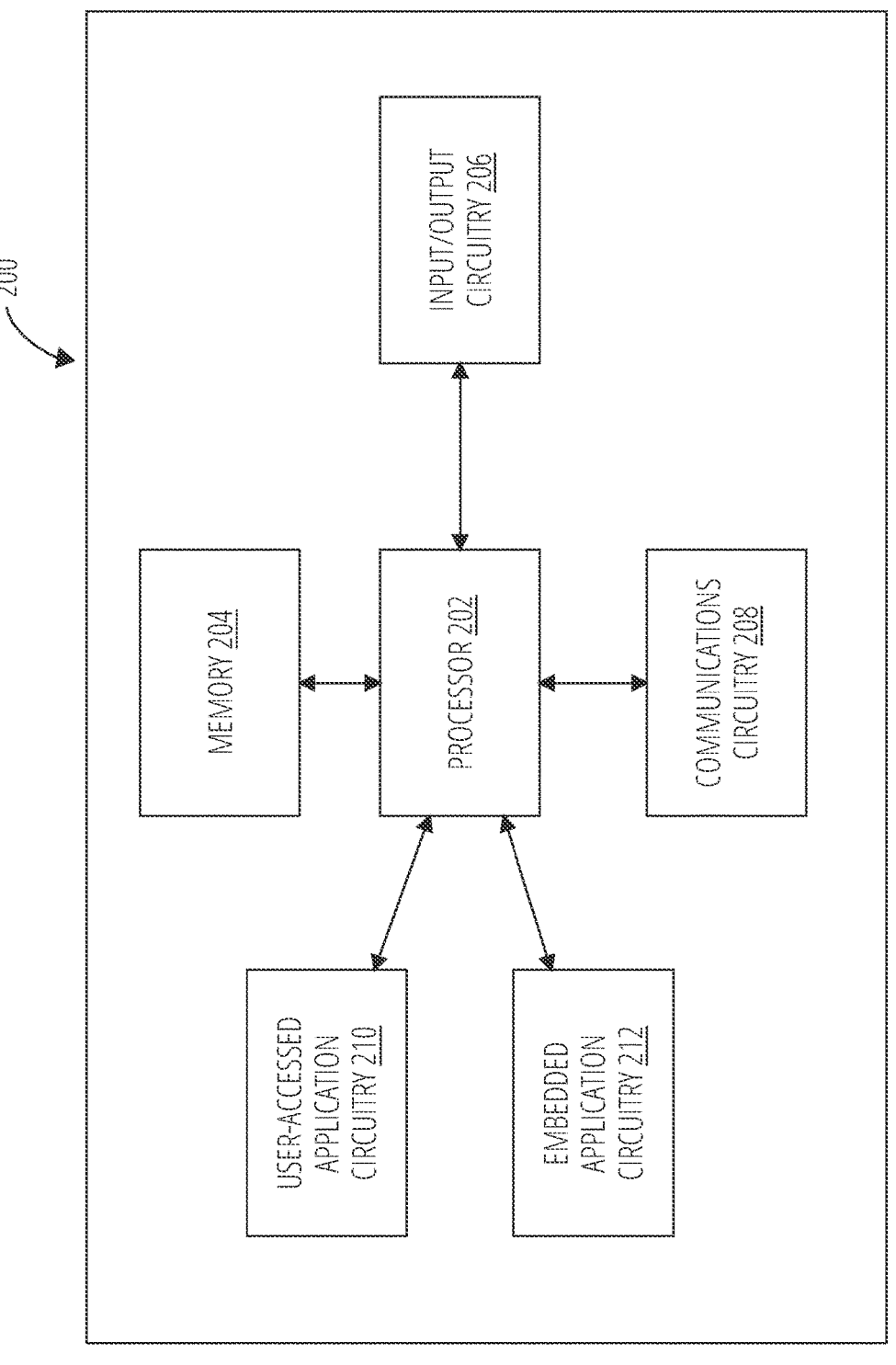
FIG. 2A illustrates a block diagram of an example apparatus supporting a user-accessed application accessing an embedded application in accordance with at least one embodiment of the present disclosure.

FIG. 2A illustrates a block diagram of an example apparatus supporting a user-accessed application accessing an embedded application in accordance with at least one embodiment of the present disclosure. Specifically, FIG. 2A depicts an example user-accessed application supporting apparatus ("apparatus 200") specially configured in accordance with at least some example embodiments of the present disclosure. In some embodiments, the first application system 104 and/or a portion thereof is embodied by one or more system(s), such as the apparatus 200 as depicted and described in FIG. 2A. The apparatus 200 includes processor 202, memory 204, input/output circuitry 206, communications circuitry 208, user-accessed application circuitry 210, and/or embedded application circuitry 212. In some embodiments, the apparatus 200 is configured, using one or more of the sets of circuitry embodied by processor 202, memory 204, input/output circuitry 206, communications circuitry 208, user-accessed application circuitry 210, and/or embedded application circuitry 212, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with establishing a data-driven connection between a user-accessed application and an embedded application. In some such embodiments, the processor 202 includes hardware, software, firmware, and/or a combination thereof that causes determination of whether a storage access API is accessible, the storage access API associated with a particular embedded application. Additionally or alternatively, in some embodiments, the processor 202 includes hardware, software, firmware, and/or a combination thereof that supports rendering of a user interface for logging into the embedded application. Additionally or alternatively, in some embodiments, the processor 202 includes hardware, software, firmware, and/or a combination thereof that receives data from the credential-based access component utilized to access the storage access API associated with the embedded application. Additionally or alternatively, in some embodiments, the processor 202 includes hardware, software, firmware, and/or a combination thereof that accesses the storage access API associated with the embedded application to establish a data-driven connection with the embedded application. Additionally or alternatively, in some embodiments, the processor 202 includes hardware, software, firmware, and/or a combination thereof that accesses the data-driven connection associated with the embedded application to initiate embedded application functionality supported by the embedded application.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes user-accessed application circuitry 210. The user-accessed application circuitry 210 includes hardware, software, firmware, and/or a combination thereof, that supports user-accessed application functionality of a user-accessed application. For example, in some embodiments, the user-accessed application circuitry 210 includes hardware, software, firmware, and/or a combination thereof, that receives a request from a user-facing application and initiates particular user-accessed application functionality based at least in part on the at request. Additionally or alternatively, in some embodiments, the user-accessed application circuitry 210 includes hardware, software, firmware, and/or a combination thereof, that generates and transmits response data to a user-facing device in response to a request to access user-accessed application functionality. Additionally or alternatively, in some embodiments, the user-accessed application circuitry 210 includes hardware, software, firmware, and/or a combination thereof, that facilitates and/or triggers authentication of user credentials associated with the user-accessed application. In some embodiments, user-accessed application circuitry 210 includes a separate processor, specially configured field programmable gate array (FPGA), or a specially programmed application specific integrated circuit (ASIC).

In some embodiments, the apparatus 200 includes embedded application circuitry 212. The embedded application circuitry 212 includes hardware, software, firmware, and/or a combination thereof, that supports accessing embedded application functionality from for an embedded application made accessible via embedding within a user-facing application associated with a user-accessed application. For example, in some embodiments, the embedded application circuitry 212 includes hardware, software, firmware, and/or a combination thereof, that facilitates communication with a second application system 106. Such communication may be performed directly with the second application system 106 or through configuring of an integrated interface associated with a user-facing application corresponding to a user-accessed application. Additionally or alternatively, in some embodiments, the embedded application circuitry 212 includes hardware, software, firmware, and/or any combination thereof, that facilitates a data-driven connection with the embedded application upon accessing a storage access API. In some embodiments, embedded application circuitry 212 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, user-accessed application circuitry 210, and/or embedded application circuitry 212 are combined. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, communications circuitry 208, user-accessed application circuitry 210, and/or embedded application circuitry 212, are combined into a single module embodied in hardware, software, firmware, and/or a combination thereof. Similarly, in some embodiments, one or more of the sets of circuitry, for example user-accessed application circuitry 210 and/or embedded application circuitry 212, is/are combined with the processor 202, such that the processor 202 performs one or more of the operations described above with respect to each of these sets of circuitry embodied by the user-accessed application circuitry 210 and/or embedded application circuitry 212.

Figure 2B:
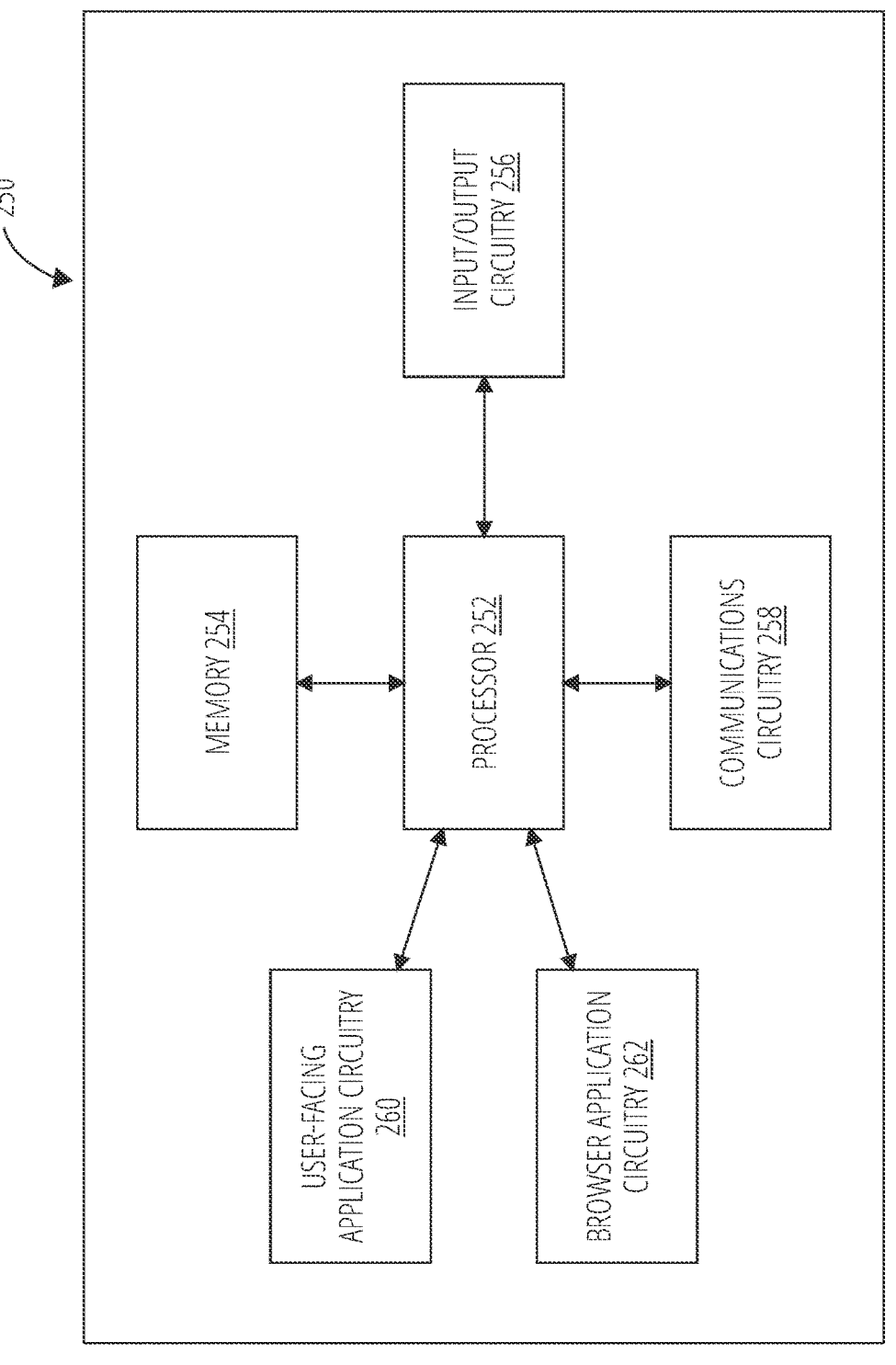
FIG. 2B illustrates a block diagram of an example apparatus supporting a user-facing application corresponding to a user-accessed application in accordance with at least one embodiment of the present disclosure.

FIG. 2B illustrates a block diagram of an example apparatus supporting a user-facing application corresponding to a user-accessed application in accordance with at least one embodiment of the present disclosure. FIG. 2B illustrates a block diagram of an example apparatus supporting a user-facing application corresponding to a user-accessed application configured to access a storage access API to establish a data-driven connection with an embedded, in accordance with at least one embodiment of the present disclosure. Specifically, FIG. 2B illustrates an example user-facing apparatus 250 ("apparatus 250") specifically configured in accordance with at least one example embodiment of the present disclosure. In some embodiments the user device 102 is/are embodied by one or more system(s), device(s), and/or the like, such as the apparatus 250 as depicted and described in FIG. 2B. The apparatus 250 includes processor 252, memory 254, input/output circuitry 256, communications circuitry 258, user-facing application circuitry 260, and/or browser application circuitry 262. In some embodiments, the apparatus 250 is configured, using one or more of the processor 252, memory 254, input/output circuitry 256, communications circuitry 258, user-facing application circuitry 260, and/or browser application circuitry 262, to execute and perform one or more of the operations described herein.

In some embodiments, the processor 252, memory 254, input/output circuitry 256, and communications circuitry 258, function similarly or identically to the similarly named sets of circuitry embodying processor 202, memory 204, input/output circuitry 206, and communications circuitry 208 as depicted and described with respect to the apparatus 200 in FIG. 2B. Additionally or alternatively, in some embodiments, the processor 252 includes hardware, software, firmware, and/or a combination thereof, that supports functionality performed by the user devices as depicted and described with respect to FIG. 1, for example the user device 102. For example, in some embodiments, the processor 252 includes hardware, software, firmware, and/or a combination thereof, that supports access to user-accessed application functionality and/or embedded application functionality via direct and/or indirect communication with corresponding systems, application servers, and/or the like. For purposes of brevity, repeated disclosure with respect to the functionality of such similarly named sets of circuitry is omitted herein.

In some embodiments, the apparatus 250 includes user-facing application circuitry 260. The user-facing application circuitry 260 includes hardware, software, firmware, and/or a combination thereof, that supports rendering of a user-facing application and execution of functionality accessible via the user-facing application. For example, in some embodiments, the user-facing application circuitry 260 includes hardware, software, firmware, and/or a combination thereof, that initiates a user-facing application associated with a user-accessed application. Additionally or alternatively, in some embodiments, the user-facing application circuitry 260 includes hardware, software, firmware, and/or a combination thereof, that supports execution of user-accessed application functionality via the user-facing application. Additionally or alternatively, in some embodiments, the user-facing application circuitry 260 includes hardware, software, firmware, and/or a combination thereof, that supports execution of embedded application functionality via the user-facing application. Additionally or alternatively, in some embodiments, the user-facing application circuitry 260 includes hardware, software, firmware, and/or a combination thereof, that facilitates rendering of user interfaces in accordance with the user-accessed application functionality and/or embedded application functionality. Additionally or alternatively, in some embodiments, the user-facing application circuitry 260 includes hardware, software, firmware, and/or a combination thereof, that causes rendering of embedded interface via a user-facing application. Additionally or alternatively, in some embodiments, the user-facing application circuitry 260 includes hardware, software, firmware, and/or a combination thereof, that determines whether a storage access API associated with an embedded application is accessible via a user-facing application associated with the user-accessed application. Additionally or alternatively, in some embodiments, the user-facing application circuitry 260 includes hardware, software, firmware, and/or a combination thereof, that causes rendering of credential-based access components and/or related user interfaces via the user-facing application. Additionally or alternatively, in some embodiments, the user-facing application circuitry 260 includes hardware, software, firmware, and/or a combination thereof, that receives data from a credential-based access component and/or processes such received data, for example user credentials, authentication success data, and/or the like. Additionally or alternatively, in some embodiments, the user-facing application circuitry 260 includes hardware, software, firmware, and/or a combination thereof, that receives data indicating access of a storage access API. Additionally or alternatively, in some embodiments, the user-facing application circuitry 260 includes hardware, software, firmware, and/or a combination thereof, that accesses a storage access API to establish a data-driven connection with an embedded application via the user-facing application. In some embodiments, user-facing application circuitry 260 includes a separate processor, specially configured field programmable gate array (FPGA), or a specially programmed application specific integrated circuit (ASIC).

Additionally, in some embodiments the apparatus 250 includes browser application circuitry 262. The browser application circuitry 262 includes hardware, software, firmware, and/or a combination thereof, that supports a browser application executed via the apparatus 250. The browser application provides functionality performed via the apparatus 250. For example, in some embodiments the browser application circuitry 262 includes hardware, software, firmware, and/or any combination thereof, that accesses a web service, such as via a URL, associated with an embedded application and/or user-accessed application. Additionally or alternatively, in some embodiments the browser application circuitry 262 includes hardware, software, firmware, and/or any combination thereof, that supports provisioning of a storage access API. The storage access API in some embodiments is configurable such that access to the storage access API is independent for each distinct application, and storage of data is independent to each of such applications. Additionally or alternatively, in some embodiments the browser application circuitry 262 includes hardware, software, firmware, and/or any combination thereof, that utilizes the storage access API to store tokens, user credentials, and/or other data utilized to authenticate a user account identity provisioned for accessing a particular application. In some embodiments, browser application circuitry 262 includes a separate processor, specially configured field programmable gate array (FPGA), or a specially programmed application specific integrated circuit (ASIC).

Additionally or alternatively, in some embodiments, two or more of the sets of circuitries embodying processor 252, memory 254, input/output circuitry 256, communications circuitry 258, user-facing application circuitry 260, and/or browser application circuitry 262 are combined. Alternatively or additionally, in some embodiments, one or more of the sets of circuitry perform some or all of the functionality described associated with another component. For example, in some embodiments, two or more of the sets of circuitry embodied by processor 252, memory 254, input/output circuitry 256, communications circuitry 258, user-facing application circuitry 260, and/or browser application circuitry 262, are combined into a single module embodied in hardware, software, firmware, and/or a combination thereof. Similarly, in some embodiments, one or more of the sets of circuitry, for example user-facing application circuitry 260 and/or browser application circuitry 262, is/are combined with the processor 252, such that the processor 252 performs one or more of the operations described above with respect to each of these sets of circuitry embodied by the user-facing application circuitry 260 and/or browser application circuitry 262.

Example Interfaces and Data Architectures of the Disclosure

Having described example systems and apparatuses of the present disclosure, example user interfaces and data architectures in accordance with the disclosure will now be discussed. It should be appreciated that the user interfaces and the data architectures described herein may be maintained via one or more of the systems and/or apparatuses described herein. For example, in some embodiments, the specially configured apparatuses 200 and/or 250 described herein are configured to maintain a software environment embodying the data architecture and/or providing the user interfaces depicted and described herein. It should be appreciated that such software environments may be maintained entirely on a single device, apparatus, and/or system, and/or be maintained through interaction with multiple devices, apparatuses, and/or systems. For example, in some embodiments, a portion of the computing environments embodying the user interfaces and/or data architecture is maintained by a first application system associated with an embedded application, and a second portion of the computing environment is maintained by a second application system associated with the user-accessed application and/or corresponding user device associated with the user-accessed application.

Figure 3:
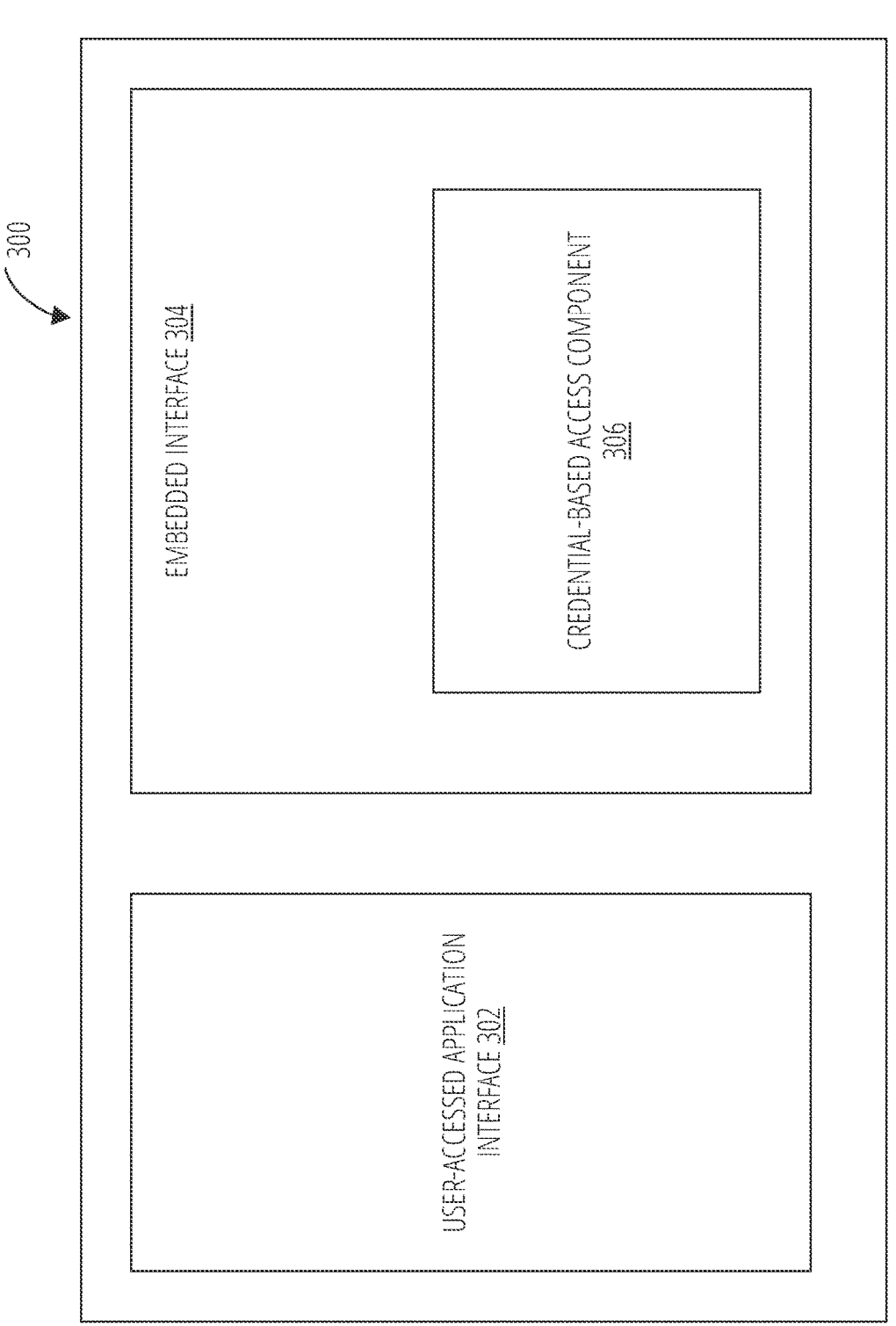
FIG. 3 illustrates an example user interface supporting use of a storage access API for accessing an embedded application via a user-accessed application in accordance with at least one embodiment of the present disclosure.

FIG. 3 illustrates an example user interface supporting use of a storage access API for accessing an embedded application via a user-accessed application in accordance with at least one embodiment of the present disclosure. Specifically, FIG. 3 illustrates an example user interface 300 renderable via a user-facing application. In some embodiments, the user-facing application causes rendering of particular user interfaces and/or sub-interfaces thereof that enable performance of the operations as depicted and described herein. In some embodiments, the user interface 300 embodies a native application executed via a user device, for example embodied by the apparatus 250. Additionally or alternatively, in some embodiments, the user interface 300 embodies a web application executed using a browser application via a user device.

The user interface 300 includes a user-accessed application interface 302. In some embodiments, the user-accessed application interface 302 embodies a first sub-interface of the user interface 300. In some embodiments, the user-accessed application interface 302 is configured based at least in part on a corresponding user-accessed application. For example, the user-accessed application may provide particular data for rendering to the user-accessed application interface 302, instructions configuring one or more aspects of the user-accessed application interface 302, and/or the like. In some embodiments, the user-facing application communicates with the user-accessed application via a series of requests and responses to configure the user-accessed application interface 302. Additionally or alternatively, in some embodiments the user-accessed application interface 302 is configured based at least in part on local software executed on the apparatus 250, for example stored as an app on the apparatus 250 embodying a specially configured user device 102. In some embodiments, the user-accessed application interface 302 is configured to receive user input that triggers execution of particular user-accessed application functionality.

The user interface 300 further includes an embedded interface 304. In some embodiments, the embedded interface 304 embodies at least a second sub-interface of the user interface 300. In some embodiments, the embedded interface 304 is configured based at least in part on a corresponding embedded application. In some embodiments, the embedded interface 304 is configured via a browser application executed via the user-facing application on the apparatus 250. Additionally or alternatively, in some embodiments, the embedded interface 304 includes a wrapper component, where the wrapper component configures and/or otherwise controls rendering and/or interaction with an iframe enables access to embedded application functionality. The wrapper component in some embodiments comprises a sub-portion of the user-accessed application including functionality for accessing a corresponding URL or other particular target endpoint corresponding to requested embedded application functionality. For example, in some embodiments the user interface 300 includes a particular specially configured iframe that accesses one or more web services associated with the embedded application and facilitated based at least in part on an embedded application system. Additionally or alternatively still, in some embodiments, an embedded application provides data for rendering particular interface elements to the embedded interface 304, instructions for configuring one or more aspects of the embedded interface 304, and/or the like. In some embodiments, the user-facing application communicates with the embedded application utilizing functionality of the browser application executable on the apparatus 250. In some embodiments, the embedded interface 304 is configured utilizing a data-driven connection that connects the user-facing application with the corresponding embedded application, for example by accessing a storage access API to establish access to the storage access API corresponding to the embedded application.

The user interface 300 further includes credential-based access component 306. In some embodiments, the credential-based access component 306 embodies an additional sub-interface of the 300. Additionally or alternatively, in some embodiments, the credential-based access component 306 embodies a sub-interface of the embedded interface 304. In this regard, in some such embodiments the credential-based access component 306 is rendered within the bounds of the embedded interface 304. The credential-based access component 306 may be independently accessed, interacted with, and in some circumstances closed separate from other interfaces of the embedded interface 304.

In some embodiments, rendering of the credential-based access component 306 is triggered by the embedded interface 304 itself. Additionally or alternatively, in some embodiments, rendering of the credential-based access component 306 is triggered directly by a user-facing application that controls and/or otherwise facilitates rendering of the user interface 300. In some embodiments, the credential-based access component 306 is configured to receive user input associated with configuring access to a storage access API associated with an embedded application, for example the embedded application corresponding to the embedded interface 304. In some embodiments, the credential-based access component 306 includes interface elements configured to receive user credentials associated with an embedded application. Additionally or alternatively, in some embodiments, the credential-based access component 306 includes interface elements that receive user input indicating authorization of accessing and/or sharing access of a storage associated with the embedded application via the storage access API.

In some embodiments, the credential-based access component 306 is configured to transmit and/or otherwise provide particular data back to the user-facing application. In some embodiments, the credential-based access component 306 triggers data communication to the embedded interface 304 in response to particular user input. Additionally or alternatively, in some embodiments, the credential-based access component 306 triggers data communication to the user-accessed application generally in response to particular user input. For example, in some embodiments, the credential-based access component 306 facilitates transmission of authentication success data in response to particular user input and/or messages received at the credential-based access component 306. Additionally or alternatively still, in some embodiments, the credential-based access component

306 facilitates transmission of messages indicating that user credentials associated with an embedded application were successfully authenticated, and/or that access to a storage access API associated with the embedded application was successfully granted. Additionally or alternatively, in some embodiments, the credential-based access component 306 facilitates notification of closing of the user interface embodying the credential-based access component 306, for example in response to closing out of a browser interface via an exit control as known in the art.

The user interface 300 thus may facilitate access to various functionality. For example, in some embodiments, a user of the user-facing application may interact with the user interface 300 to perform or otherwise initiate particular user-accessed application functionality via the user-accessed application interface 302, and/or embedded application functionality via the embedded interface 304. In circumstances where a data-driven connection with the embedded application is not yet established and/or access to a storage access API associated with the embedded application is not yet permitted, the user-facing application may cause rendering of one or more of the credential-based access component 306 via the embedded interface 304 and/or directly to facilitate granting of such access. A user may continue to interact with any of the user interfaces and/or sub-interfaces thereof utilizing any of a myriad of input types, for example a touch, tap, click, button press, voice command, gesture, peripheral input, and/or the like.

Figure 4:
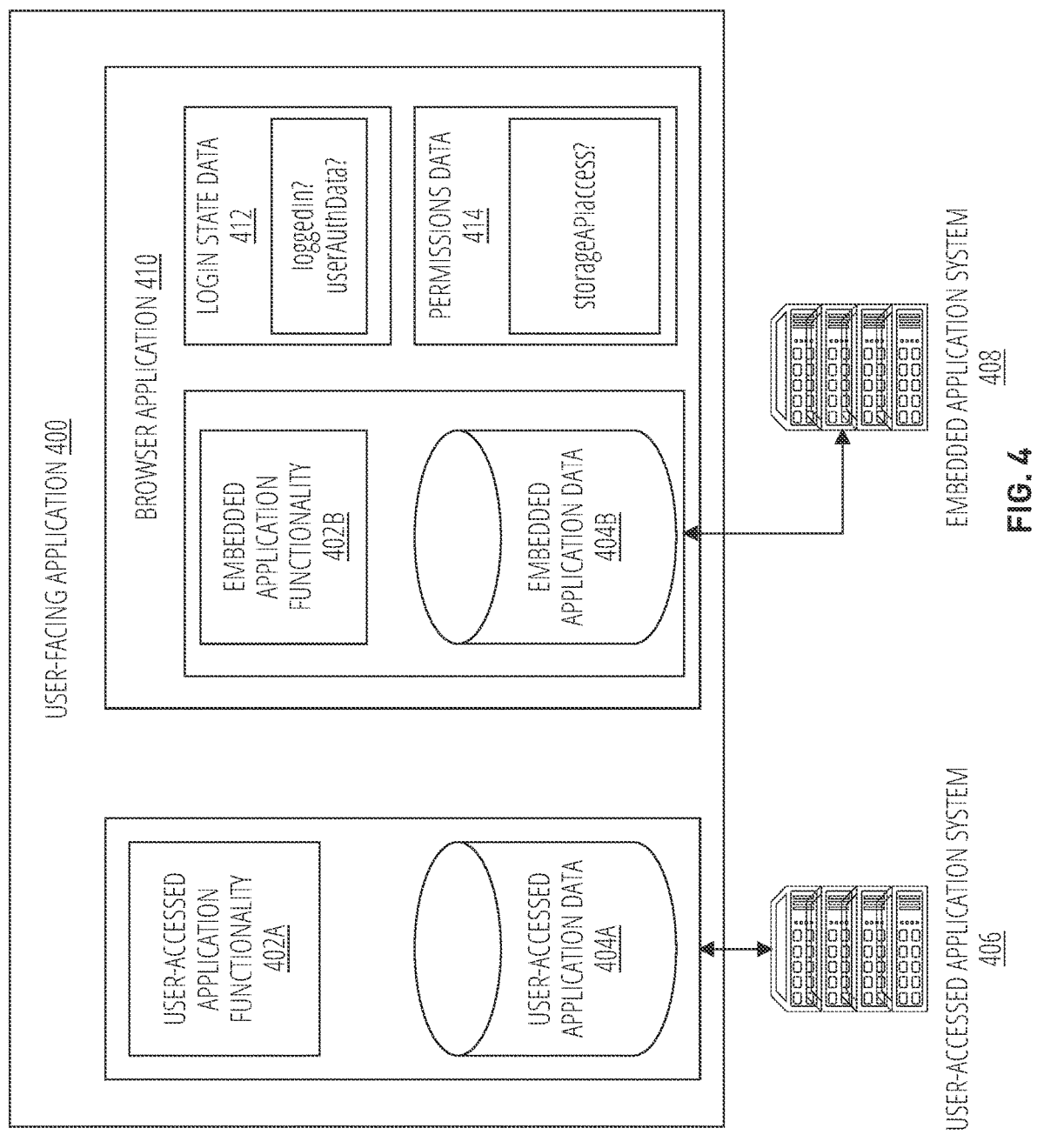
FIG. 4 illustrates a visualization of a data architecture that supports use of a storage access API for establishing a data-driven connection between a user-accessed application and an embedded application accessible via a user-facing application in accordance with at least one embodiment of the present disclosure.

FIG. 4 illustrates a visualization of a data architecture that supports use of a storage access API for establishing a data-driven connection between a user-accessed application and an embedded application accessible via a user-facing application in accordance with at least one embodiment of the present disclosure. Specifically, FIG. 4 depicts the various underlying sub-applications that may function independently and/or in concert to provide the interoperable functionality of an embedded application from within a user-facing application 400 of a user-accessed application, as described herein. For example, in some embodiments, the data architecture as depicted and described with respect to FIG. 4 supports the configuration of the user interface 300 and/or operations of the sub-interfaces thereof as depicted and described with respect to FIG. 3. In some embodiments, the apparatus 250 executes the user-facing application 400 to provide such functionality.

FIG. 4 depicts an example user interface of a user-facing application 400. The user interface depicted embodies an integrated interface of a user-facing application 400, which provides access to various functionality supported by individual sub-applications, which may be executed by code bases entirely external from the user-facing application 400 and/or at least in part included in the user-facing application 400 and/or supported by local applications executed on the same system as the user-facing application 400. In this regard, each of the individual sub-applications may perform different operations that facilitate the functionality as depicted and described herein.

In some embodiments, the user-facing application 400 supports a user-accessed application. The user-accessed application provides for user-accessed application functionality 402A. In one example context, the user-accessed application functionality 402A includes dynamic workflow and task management functionality. It will be appreciated that the user-accessed application functionality 402A may include any desired functionality facilitated via one or more software applications. The user-accessed application functionality 402A in some embodiments generates, stores, accesses, manipulates, and/or otherwise interacts with user-accessed application data 404A. In some embodiments, the user-accessed application data 404A is stored via one or more databases supported via the user-accessed application data 404A.

In some embodiments, some or all portions of the functionality of the user-accessed application made available via the user-facing application 400 are supported by a user-accessed application system 406. In some embodiments, the user-accessed application system 406 is remote from the user-facing application 400, for example embodied by the first application system 104 as depicted and described with respect to FIG. 1. In this regard, the user-facing application 400 may facilitate a first connection with the user-accessed application system 406 to facilitate transmission of messages to the user-accessed application system 406, receiving of messages from the user-accessed application system 406, and/or the like to facilitate such functionality. In some embodiments, the connection with the user-accessed application system 406 is facilitated via a data-driven connection in response to authentication of first user credentials associated with the user-accessed application provided directly via the user-facing application 400 and authenticated via the user-accessed application system 406 and/or a related system configured for such authentication.

In some embodiments, the user-facing application 400 includes or otherwise manages at least one instance of a browser application 410. In some embodiments, the browser application 410 facilitates access to one or more web applications embodying the embedded application or a portion thereof. In some embodiments, the user-facing application 400 is configured to initiate, maintain, and/or otherwise control operation of the browser application 410. For example, in some embodiments, the browser application 410 initiates and/or otherwise causes rendering of an integrated interface within the user-facing application 400, where the integrated interface is embodied by an iframe or a related independently controlled sub-interface and/or process.

In some embodiments, the browser application 410 supports various instances. For example, in some embodiments, the browser application 410 supports a first instance that is specially configured based on a wrapper associated with the user-accessed application. In this regard, the wrapper may embody a component that provides access to a sub-interface, such as an iframe, at the application level corresponding to the user-accessed application. The browser application 410, or a different browser application, in some embodiments additionally supports a second instance embodying or otherwise facilitating rendering of a credential-based access component. In some embodiments, the credential-based access component embodies a top level domain facilitated via an instance of the browser application 410. It should be appreciated that the distinct instances may be controlled independently, have access to independent memory spaces for data storage and communication, and/or the like.

In some embodiments, the browser application 410 is utilized to provide the embedded application functionality 402B associated with the embedded application. In some embodiments, the embedded application functionality 402B generates, stores, and/or otherwise is supported based at least in part by the embedded application data 404B, for example in a manner similar as depicted and described with respect to the user-accessed application and corresponding user-accessed application functionality 402A and user-accessed application data 404A. For example, in some embodiments, the embedded application embodies a web-accessible application that supports creation and/or organization of the structured electronic documentation, management of created electronic documentation by the user, modification of information associated with the various electronic documentation, and/or to share specific electronic documentation and/or sets of electronic documentation with other user accounts representing other users of the embedded application.

In some embodiments, access to the embedded application functionality 402B is managed by the browser application 410 based at least in part on communication with the embedded application system 408. In some embodiments, the embedded application system 408 is remote from the user-facing application 400, for example embodied by the second application system 106 as depicted and described with respect to FIG. 1. In this regard, the user-facing application 400 may facilitate a second connection with the embedded application system 408 to facilitate transmission of messages to the embedded application system 408, receiving of messages from the embedded application system 408, and/or the like to facilitate such functionality. In some embodiments, the connection embodies a data-driven connection facilitated based at least in part on the user-facing application 400 directly, and/or the user-accessed application system 406. The data-driven connection established with the embedded application system 408 in some embodiments is facilitated in response to authentication of second user credentials associated with the embedded application. Security barriers associated with the browser application 410 and/or embedding in the user-facing application 400 may prevent direct input of such user credentials for use from within the user-facing application 400. Accordingly, embodiments of the present disclosure may utilize the storage access API and related mechanisms for granting access to the storage access API as depicted and described herein to enable interoperability from within the embedding in the user-facing application 400.

In some embodiments, the browser application 410 provides various particular functionality leveraged by the user-facing application 400 to enable configuration of access to the storage access API associated with the embedded application and/or to facilitate utilization of the storage access API (e.g., to establish a data-driven connection with the embedded application). In some embodiments, the browser application 410 maintains login state data 412. The login state data 412 in some embodiments includes data indicating whether a user account associated with an application has been successfully authenticated, and/or whether data usable to authenticate the identity with the corresponding application is stored. In some embodiments, for example, the login state data 412 includes a loggedIn Boolean, flag, or other data indicating whether current data usable to authenticate with a particular user account corresponding to the embedded application is currently stored. Additionally or alternatively, in some embodiments, the login state data 412 includes userAuthData that, if stored, is usable to authenticate with the embedded application to establish a data-driven connection associated with a particular authenticated user account. In some embodiments, the userAuthData includes a valid shared cookie corresponding to the embedded application, where the shared cookie is associated with a particular user account authenticated for accessing functionality of the embedded application. In other embodiments, the userAuthData includes a valid token, user credentials associated with a user account, and/or the like. In some embodiments, the login state data 412 or at least a portion thereof is maintained by the browser application 410 in a manner accessible to the user-facing application 400 upon request.

In some embodiments, the user-facing application 400 maintains permissions data 414. The permissions data 414 in some embodiments indicates whether the user-facing application 400 has access to a storage access API associated with a particular application to access data stored via the browser application 410 associated with that application. For example, in some embodiments, the permissions data 414 includes a Boolean, flag, or other data indicating whether the user-facing application 400 is configured to access a storage access API associated with the embedded application, for example to access a storage of the browser application 410 including data associated with the browser application 410. Data stored via and retrievable via the storage access API may include a shared cookie associated with the embedded application. Additionally or alternatively, in some embodiments the data stored via and retrievable via the storage access API includes user credentials, access tokens, and/or other data utilized to authenticate an identity corresponding to an authenticated user account of the embedded application. In this regard, in some embodiments, permission to access the storage access API associated with the embedded application must be granted to enable the user-facing application 400 to access the data utilized to establish a data-driven connection with the embedded application having access embedded within the user-facing application 400. In some embodiments the permission is granted upon each execution of the user-facing application 400, in other embodiments the permission is granted once and persisted throughout instances of the user-facing application 400.

Example Processes of the Disclosure

Having described example systems, apparatuses, user interfaces, and data architectures in accordance with the disclosure, example processes in accordance with the present disclosure will now be described. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 5:
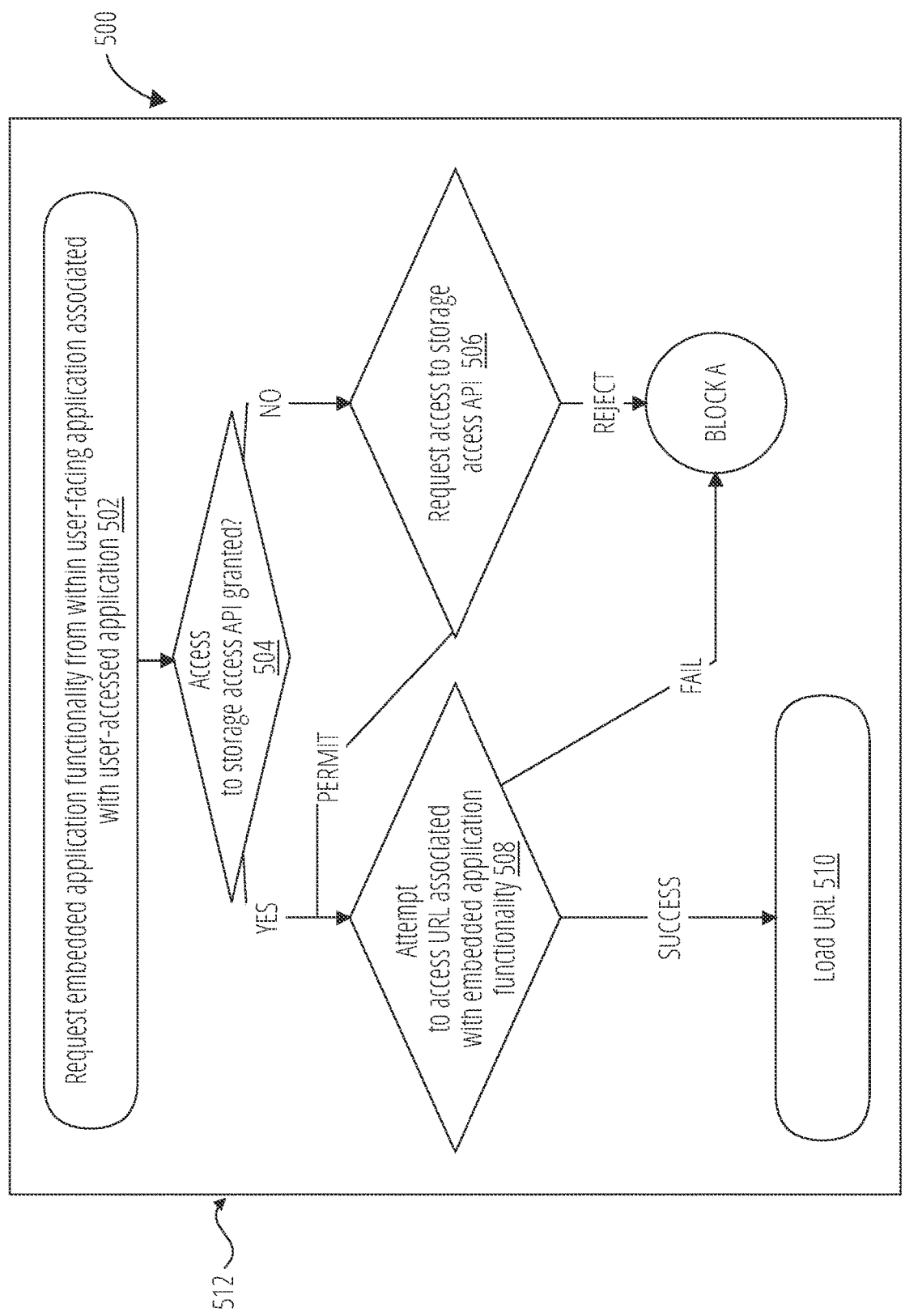
FIG. 5 illustrates a flowchart including example operations of a process for configuring access to a storage access API in accordance with at least one embodiment of the present disclosure.

FIG. 5 illustrates a flowchart including example operations of a process for configuring access to a storage access API in accordance with at least one embodiment of the present disclosure. Specifically, FIG. 5 illustrates an example process 500. The process 500 embodies an example computer-implemented method. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 250 alone or in communication with one or more other component(s), device(s), system(s), and/or the like, for example in communication with the apparatus 200. In this regard, in some such embodiments, the apparatus 250 is specially configured by computer-coded instructions (e.g., computer program instructions) stored thereon, for example in the memory 254 and/or another component depicted and/or described herein and/or otherwise accessible to the apparatus 250, for performing the operations as depicted and described. In some embodiments, the apparatus 250 is in communication with one or more external apparatus(es), system(s), device(s), and/or the like, to perform one or more of the operations as depicted and described. For example, the apparatus 250 in some embodiments is in communication with a user-accessed application system and/or an embedded applications system, as depicted and described. For purposes of simplifying the description, the process 500 is described as performed by and from the perspective of the apparatus 250.

In some embodiments, the process 500 is performed via one or more applications executed via the apparatus 250. The applications in some embodiments maintain one or more sub-interfaces and/or associated supporting logic and/or other functionality that facilitates the 500. For example, in some embodiments, the process 500 is performed via an embedded interface 512. The embedded interface 512 in some embodiments is provided within a user-facing application, for example where the user-facing application initiates rendering of the embedded interface 512 and/or controls the embedded interface 512 directly or via communication with a browser application executed on the apparatus 250 and controlled at least in part via the user-facing application.

In some embodiments, the embedded interface 512 includes or is embodied by a plurality of interacting components. For example, in some embodiments, the embedded interface 512 includes at least a wrapper component and an iframe component. In some embodiments, the wrapper component supports the iframe, which embodies a third-party environment for communication with the embedded application that is separate from the control of the user-accessed application and/or user-facing application associated therewith directly. In some such embodiments, the wrapper component comprises a sub-component or other application of the user-accessed application and/or user-facing application corresponding to the user-accessed application. In this regard, the embedded interface 512 may be deemed to include separate environments—a wrapper component environment embodying a first environment associated with the embedded interface 512 that is part of the user-accessed application functionality, and an iframe environment embodying a second, distinct environment of the embedded interface 512 and associated with the embedded application. The embedded interface 512, and/or any or both components thereof, may be supported by a first instance of a browser application.

In some embodiments, one or more initial steps occur that set up the relevant interfaces and/or corresponding environments associated with facilitating application access via a storage access API. For example, in some examples, the method includes causing rendering, by the user-facing application associated with the user-accessed application, of a wrapper component. The wrapper component in some embodiments is configured as a portion of an embedded interface within the user-facing application, and in some embodiments the wrapper component includes one or more code portions of the embedded application. In some embodiments, the wrapper component further controls or otherwise includes an iframe that facilitates access to the embedded application. In some such embodiments, the wrapper component facilitates rendering and/or access to particular interfaces via the iframe of the embedded interface. In this regard, the iframe may be considered a fully third-party environment separate from the user-accessed application and/or user-facing application corresponding to the user-accessed application, where the user-facing application and/or user-accessed application embody a primary application within which the embedded application is embedded. For example, in some embodiments, the embedded interface rendered within the user-facing application comprises both the wrapper component and associated iframe interface.

According to some examples, the method includes requesting embedded application functionality from within user-facing application associated with user-accessed application at operation 502. In some embodiments, the request is initiated automatically upon a user accessing the embedded interface 512. Additionally or alternatively, in some embodiments, the request for the embedded application functionality is initiated upon user input with a particular interface element rendered within the user-facing application, for example associated with accessing functionality supported by the embedded application. In some embodiments, the request identifies a particular URL to be accessed associated with an embedded application, where the URL corresponds to particular requested embedded application functionality. In some embodiments, the wrapper component of the embedded interface 512 causes rendering of the iframe with a determined URL associated with the storage access API.

According to some examples, the method includes determining whether access to a storage access API is granted at operation 504. In some embodiments, the operator 504 is performed by an iframe of the embedded interface 512, for example upon loading of a particular URL prompted by a wrapper component of the embedded interface. In some embodiments, the operation 504 embodies a determination procedure that checks for permissioning of access to the storage access API for a particular application. In some embodiments, the user-facing application, directly or via a browser application supporting the embedded interface 512, determines whether the storage access API associated with the embedded application is accessible from within the user-facing application. In some embodiments, a browser application supporting the embedded interface 512 is queried to determine whether permission is granted to share access to the storage access API associated with the embedded application from within the user-facing application associated with the user-accessed application. In some embodiments, browser application functionality for performing the check of whether such permissions are granted is provided native to the browser application. In circumstances where embodiments determine that access to the storage access API is not granted, flow proceeds to operation 506. In circumstances where embodiments determine that access to the storage access API is granted, flow proceeds to operation 508.

According to some examples, the method includes requesting access to storage access API at operation 506. In some embodiments, the access to the storage access API associated with the embedded application is requested via a native permissions request button or other sub-interface surfaced via a browser application supporting the embedded interface 512. In some such embodiments, the native permissions request buttons may be rendered in a browser-specific manner that differs between browser applications supporting the embedded interface. For example, the embedded interface 512 may be utilized to cause rendering of a permissions access interface that includes a button for granting permission of access to the storage access API associated with the embedded application and a button for denying such access. The user may interact with either such buttons to grant permission of such access and/or deny permission of such access. In circumstances where a user permits access to the storage access API associated with the embedded application, flow proceeds to operation 508. In circumstances where a user rejects access to the storage access API, or in some embodiments otherwise does not permit such access, flow proceeds to block A as depicted and described with respect to FIG. 6 herein.

According to some examples, the method includes attempting to access a URL associated with embedded application functionality at operation 508. The URL in some embodiments corresponds to the original request for embedded application functionality received at operation 502. In some embodiments, access of the URL is attempted via a browser application supporting the embedded interface 512. For example, in some embodiments, the embedded interface 512 via the browser application transmits one or more requests and/or other messages to the URL identified based at least in part on the user input corresponding to a request for particular embedded application functionality. In some embodiments, the URL corresponds to a particular endpoint of an embedded application system that facilitates access to the embedded application functionality, or in some embodiments the URL corresponds to a particular endpoint of a user-accessed application system that facilitates indirect communication with the embedded application system to provide such functionality. The browser application may receive a response from the URL (e.g., in response to the one or more requests) indicating whether access is permitted to determine whether the URL was successfully accessed, for example based at least in part on whether the requests resolve successfully/receive an indication that the URL is accessible or whether an error was received. In some embodiments, an error is received indicating a user is not logged in, and/or the URL is otherwise currently inaccessible due to improper configuring of the state of the user-facing application for accessing the embedded application. In some embodiments, access to the URL is based at least in part on a login state associated with the embedded application, for example where successful access to the URL requires a login state indicating that the user-facing application is associated with a current authenticated user account associated with the embedded application. In some embodiments, the iframe of the embedded application is updated to access the URL. For example, in some embodiments, the iframe is updated to a particular URL associated with accessing embedded application functionality via an embedded application. In some embodiments, a wrapper component of the embedded interface configures an iframe component of the embedded interface 512 to access a particular URL associated with the embedded application and/or particular functionality thereof. The iframe may provide a response message to the wrapper component, in some embodiments, indicating whether the URL successfully loads or fails.

In circumstances where the URL is successfully accessed, flow proceeds to operation 510. In circumstances where the URL is not successfully accessed, flow proceeds to block A as depicted and described with respect to FIG. 6 herein. Additionally or alternatively, in some embodiments, in circumstances where the URL is not successfully accessed then the wrapper component of the embedded interface 512 causes rendering of a particular user interface with a login call to action component, for example a login page to the iframe of the embedded interface 512, and flow proceeds to block A in response to user input with the rendered user interface (e.g., a click on a login button thereof).

According to some examples, the method includes loading the URL at operation 510. In some embodiments, the URL is loaded utilizing data retrieved via storage access API. For example, in some embodiments, the URL is loaded by accessing a shared cookie from the storage access API associated with the embedded application in a circumstance where access was previously granted to the user-facing application associated with the user-accessed application to access the storage access API associated with the embedded application. In other embodiments, the URL is loaded utilizing data previously cached by the browser application associated with the embedded interface 512 and/or corresponding user-facing application embedding the embedded interface 512.

Figure 6:
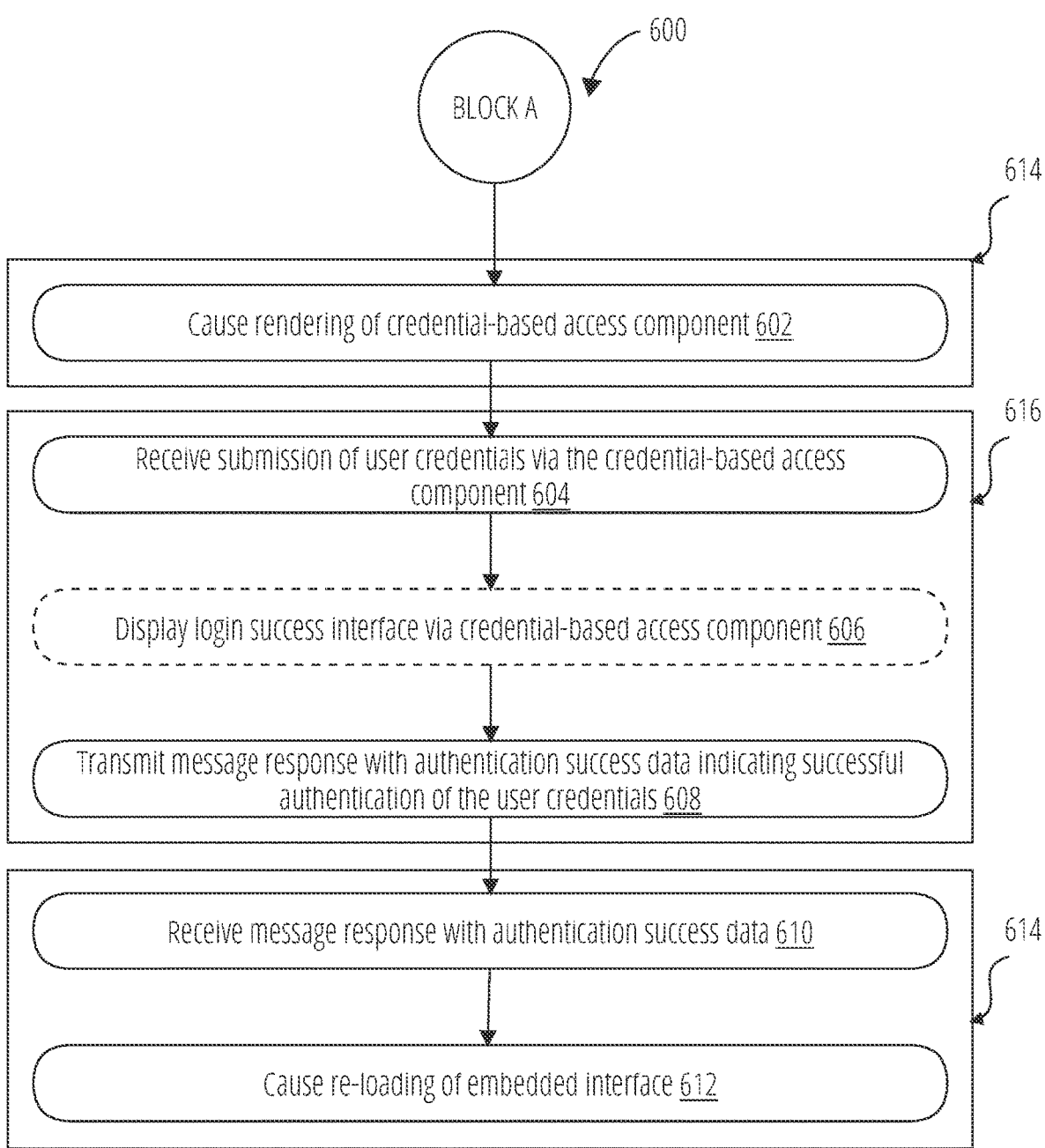
FIG. 6 illustrates a flowchart including additional example operations of a process for configuring access to a storage access API in accordance with at least one embodiment of the present disclosure.

FIG. 6 illustrates a flowchart including additional example operations of a process for configuring access to a storage access API in accordance with at least one embodiment of the present disclosure. Specifically, FIG. 6 depicts operations of an example process 600. The process 600 defines a particular computer-implemented method. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 250 alone or in communication with one or more other component(s), device(s), system(s), and/or the like, for example in communication with the apparatus 200. In this regard, in some such embodiments, the apparatus 250 is specially configured by computer-coded instructions (e.g., computer program instructions) stored thereon, for example in the memory 254 and/or another component depicted and/or described herein and/or otherwise accessible to the apparatus 250, for performing the operations as depicted and described. In some embodiments, the apparatus 250 is in communication with one or more external apparatus(es), system(s), device(s), and/or the like, to perform one or more of the operations as depicted and described. For example, the apparatus 250 in some embodiments is in communication with a user-accessed application system and/or an embedded applications system, as depicted and described. For purposes of simplifying the description, the process 500 is described as performed by and from the perspective of the apparatus 250.

The process 600 begins at operation 602. In some embodiments, the process 600 begins after one or more operations depicted and/or described with respect to any of the other processes described herein. For example, in some embodiments as depicted, the process 600 begins before and/or at execution of operation 506 and/or operation 508. In this regard, some or all of the process 600 may replace or supplement one or more blocks depicted and/or described with respect to any of the other processes described herein.

For example, in some embodiments, the process 600 executes a second portion of the process 500 in particular circumstances where flow proceeds to operation 602, indicating that access to the storage access API is to be configured. Additionally or alternatively, as depicted, upon completion of the process 500, flow may return to one or more operations of another process.

According to some examples, the method includes causing rendering of credential-based access component at operation 602. In some embodiments, the operation 602 is executed via a user-facing application accessed by the user. In some embodiments, the user-facing application 614 maintains the embedded interface 512 as depicted and described with respect to FIG. 5. In some embodiments, the user-facing application 614 performs the operation 602 via a wrapper component. In some embodiments, the wrapper component is supported at least in part by the browser application, and in other embodiments the wrapper component is provided by and/or as a part of the user-accessed application or corresponding user-facing application. For example, in some embodiments, the wrapper component is a sub-interface of the embedded interface 512 controlled at least in part by the user-facing application or corresponding user-accessed application. In this regard, in some embodiments the wrapper component triggers launching of a popup window via a second browser application instance, the popup window embodying the credential-based access component and a top level domain.

In some embodiments, the embedded interface 512 via a browser application or a particular wrapper thereof posts a message that prompts the credential-based access component. For example, in some embodiments, the user-facing application 614 receives a post message in response to an indication at the embedded interface 512 that the storage access API is inaccessible, and a user is not logged in associated with the embedded application for which embedded application functionality was requested. The user-facing application 614 may automatically initiate the credential-based access component in some embodiments. Alternatively, in some embodiments, the user-facing application 614 causes rendering of an intermediary interface that includes at least one interface element configured to indicate to the user that they must login to the embedded application to proceed, and at least one interface element configured to receive user input initiating the credential-based access component to enable such logging in. Additionally or alternatively, in some embodiments, the intermediary application indicates an agreement or other terms to be accepted by the user via user input before authenticated user credentials can be shared or otherwise accessed. In some embodiments, the credential-based access component is rendered via an instance of the browser application initiated and/or maintained by the user-facing application 614. In some embodiments, the credential-based access component is directed to a particular web interface associated with logging into the embedded application. As illustrated, the user-facing application 614 causes rendering of the credential-based access component 616.

In some embodiments, the credential-based access component 616 is supported by a particular browser application. For example, in some embodiments, the credential-based access component 616 embodies a second instance of the browser application that supports the embedded interface. Additionally or alternatively, in some embodiments, the credential-based access component 616 embodies an instance of a second browser application specific to the credential-based access component 616. In some embodiments, the second browser application is determined by the user-facing application corresponding to a user-accessed application, the embedded application, and/or the wrapper component associated with an embedded interface.

According to some examples, the method includes receiving submission of user credentials at operation 604. For example, in some embodiments, the credential-based access component 616 is utilized to support an end-to-end login workflow. In some embodiments, the submission of the user credentials is received via the credential-based access component 616 at a particular user interface associated with logging into the embedded application. In some embodiments, the user credentials include a username and password associated with a particular authenticated user account of the embedded application. It will be appreciated that in other contexts, other user credentials that are linked to a corresponding user account may be provided via a user interface rendered to the credential-based access component 616. In some embodiments, the credential-based access component 616 is directed to or otherwise configured to render a particular user interface that receives user input embodying the user credentials for submission, and/or includes at least one interface element configured to trigger submission of the user credentials in response to user input. Upon submission of the user credentials, the credential-based access component 616 may trigger submission of such user credentials to the embedded application for validation. In circumstances where the credential-based access component 616 receives a response indicating successful authentication of the user credentials, a response from the embedded application may be received that includes data utilized for submitting requests associated with the corresponding authenticated user account (e.g., a token, and/or the like). In circumstances where the credential-based access component 616 receives a response indicating that authentication of the submitted user credentials was not successful, a response from the embedded application may be received that indicates failure. The credential-based access component 616 may continue to receive user credentials and submission of such user credentials until submission of the user credentials is successful before proceeding to a subsequent operation.

In some embodiments, a credential-based access component 616 is rendered and utilized to receive the user credentials. For example, in some embodiments, the operation 604 occurs after operation 606 as depicted and described, and the credential-based access component 616 is utilized to render the input interface elements for receiving the user credentials. In some other embodiments, the submission of the user credentials is received via an embedded interface of the user-facing application 614. For example, in some such embodiments, the user credentials are received via a user interface rendered by a wrapper component of the embedded interface 512. In some such embodiments, the user credentials are forwarded from the wrapper component to an iframe of the embedded interface 512.

In some embodiments, upon successful authentication of the user credentials, data is stored via the storage access API associated with the embedded application. The data stored via the storage access API in some embodiments is stored via the credential-based access component 616. In some embodiments, the data comprises particular data utilized to validate that the user is logged in associated with a particular authenticated user account with the embedded application. For example, in some embodiments, the credential-based access component 616 facilitates generation and/or storage of a shared cookie associated with the embedded application via the storage access API. In some embodiments the credential-based access component 616 sets a session cookie associated with the embedded application from within the separate environment that includes the data authenticated for accessing the embedded application and/or particular embedded application functionality thereof. In some embodiments, the session cookie is stored to via the storage access API to the domain associated with the embedded application.

According to some examples, the method includes displaying login success interface at optional operation 606. In some embodiments, the login success interface is rendered via the credential-based access component 616. The login success interface may include interface elements indicating that the user credentials last submitted were successfully authenticated and that the user is now logged in. In some embodiments, the login success interface further comprises at least one interface element that is configured to receive user input. The user input in some such contexts is required to share the session cookie with one or more other applications, as a required input of the top level domain associated with the credential-based access component 616 to grant access to the storage access API associated with the embedded application. In this regard, once user input is received embodying permission to grant such access, the session cookie may be accessible via the storage access API from one or more other applications as a shared cookie, for example to be shared with the user-accessed application via the user-facing application and/or the like. In some embodiments, the credential-based access component proceeds without rendering the login success interface and automatically grants such permissions and/or grants such permissions for accessing the storage access API via a previous user input. It will be appreciated that different browser applications may require particular user inputs via certain environments to grant such permissions, for example via a top level domain instance.

In some embodiments, in circumstances where the credential-based access component 616 is terminated prematurely or via different means (e.g., via the native exit or "x" on a browser instance), such user input may not update the embedded interface. In this regard, the embedded interface may continue to render the existing interface until the credential-based access component 616 is resurfaced (e.g., by subsequent user input via the user interface of the embedded interface) and appropriate subsequent user input is received via the user interface of the credential-based access component.

Upon successfully logging in via authenticated user credentials, some embodiments cause rendering of an updated interface requesting access to a storage access API associated with the embedded application. For example, in some embodiments the credential-based access component 616 is updated to include interface elements associated with granting permission to access the storage access API via the user-facing application. As described above, in some embodiments the request for such permission is facilitated via native functionality of the browser application. Such native functionality may embody a browser-prompted access request corresponding to the storage access API, and may specify access of the embedded application, access by the user-facing application, and/or the like. The user may approve or reject the browser-prompted access request utilizing different interface elements associated therewith.

According to some examples, the method includes transmitting message response with authentication success data at operation 608. In some embodiments, the transmission of the message response is performed via the credential-based access component 616. For example, in some embodiments, the credential-based access component 616 generates a post message transmitted to the user-facing application 614, where the post message is received directly by the user-facing application 614 or via an integrated interface thereof.

In some embodiments, the authentication success data indicates successful authentication of the user credentials. Additionally or alternatively, in some embodiments, the authentication success data indicates that data is accessible via the storage access API associated with the embedded application to establish authenticated access to the embedded application, for example via a data-driven connection. In some embodiments, the authentication success data indicates that a shared cookie is accessible via the storage access API for use by a user-facing application to access functionality of the embedded application.

According to some examples, the method includes receiving message response with authentication success data at operation 610. In some embodiments, the message response is received via the user-facing application 614. The user-facing application 614 may receive the message response directly, and/or indirectly via a browser application supporting an embedded interface thereof. In some embodiments, the browser application receives the message response and forwards the response, or a corresponding new message, to the user-facing application for processing. In some embodiments, the user-facing application 614 receives another message response in a circumstance where authentication of the user credentials was not completed successfully. For example, the user-facing application 614 in some embodiments receives data indicating an error in a circumstance where the credential-based access component 616 was closed out or otherwise determined before successful authentication of user credentials associated with the embedded application.

According to some examples, the method includes causing re-loading of embedded interface at operation 612. In some embodiments, the user-facing application 614 triggers re-loading of the embedded interface via communication with the browser application supporting the embedded interface. For example, in some embodiments, a wrapper component associated with the embedded interface 512 receives data in response to the termination of the credential-based access component and causes rendering of an iframe with the requested URL corresponding to the user-accessed application. Upon re-loading of the embedded interface, the user-facing application may attempt to re-establish a data-driven connection with the embedded application by accessing the storage access API and utilizing data thereof, such as a shared cookie. Having logged in and permissioned such a storage access API, such data now is retrievable without requiring additional user login and/or permissioning. In this regard, in some embodiments, flow may return to operation 502 as depicted and described with respect to FIG. 5 and follow a different flow that results in successful loading of the URL as originally requested.

In some embodiments, upon re-loading of the embedded interface, one or more messages, embedded application data objects, and/or the like are received via the embedded application. In this regard, the embedded interface may be updated in response to the received data from the embedded application. For example, in some embodiments, the embedded application is updated to cause rendering of at least one embedded application interface element associated with the embedded application. The at least one embedded application interface element in some embodiments is configured based at least in part on at least one embedded application data object retrieved via the embedded application functionality, for example in response to at least one request transmitted upon re-loading of the embedded interface to a particular URL. In this regard, the re-loaded embedded interface may be updated to depict the results of and/or otherwise provide access to the requested embedded application functionality.

In some embodiments, if the embedded interface fails to successfully load the requested embedded application functionality via the iframe, an error flow is initiated. For example, in some embodiments, the wrapper component associated with the embedded interface removes the iframe from being rendered. Additionally or alternatively, in some such embodiments the wrapper component causes rendering of an error user interface that indicates that an error loading the requested embedded application functionality. The error user interface may include a specially configured link or other interface element that, in response to user input, causes initiation of a separate instance of a browser application, modal, or native application to be executed associated with directly accessing the embedded application. In this regard, the separate application may in some embodiments embody a user-accessed application corresponding to the embedded application directly rather than through embedding.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory, the at least one memory having computer-coded instructions stored thereon that, in execution with the at least one processor, cause the apparatus to:
   determine that a storage access API associated with an embedded application is not accessible via a user-facing application associated with a user-accessed application;
   cause rendering, from within the user-facing application via an embedded interface, of a first user interface;
   cause rendering of a credential-based access component configured to receive user credentials associated with logging into the embedded application;
   receive, via the credential-based access component, authentication success data indicating successful authentication of the user credentials;
   cause rendering, via the credential-based access component or a second credential-based access component, of a second user interface comprising at least one interface element configured to permission access to the storage access API;
   receive access to the storage access API in response to user input with the at least one interface element via the credential-based access component; and
   cause re-loading of the embedded interface by accessing the storage access API to provide access to an embedded application functionality.

2. The apparatus of claim 1, wherein the second user interface causes, in response to second user input, rendering of a browser-prompted access request,
   wherein the access to the storage access API is received in response to third user input with the browser-prompted access request.

3. The apparatus of claim 2, wherein the browser-prompted access request is browser-specific based at least in part on a browser application utilized to produce the credential-based access component.

4. The apparatus of claim 1, the apparatus further caused to:
   initiate a request, from within the user-facing application, to access particular requested embedded application functionality associated with the embedded application,
   wherein the embedded interface is re-loaded to the particular requested embedded application functionality.

5. The apparatus of claim 1, wherein the credential-based access component is rendered in response to second user input with the first user interface, wherein the second user input indicates a request to initiate a process for granting access to the storage access API.

6. The apparatus of claim 1, the apparatus further caused to:
   determine that a login state associated with the embedded application is not logged in, wherein the apparatus causes rendering of the first user interface via the embedded interface in response to a determination that the login state associated with the embedded application is not logged in and the storage access API associated with an embedded application is not accessible via the user-facing application.

7. The apparatus of claim 1, the apparatus further caused to:

receive, via the user-facing application, a second user input via the first user interface, the second user input associated with initiating the credential-based access component, wherein the apparatus initiates the credential-based access component in response to the second user input.

8. The apparatus of claim 1, wherein the apparatus automatically initiates the credential-based access component in response to a determination that the storage access API associated with the embedded application is not accessible via the user-facing application.

9. The apparatus of claim 1, the apparatus further caused to:

receive, via the user-accessed application, a request to access the embedded application from within the user-facing application, wherein the apparatus performs a determination that the storage access API associated with the embedded application is not accessible via the user-facing application in response to receiving the request.

10. The apparatus of claim 1, the apparatus further caused to:

automatically initiate a determination procedure that determines whether the user-accessed application has access to the storage access API associated with the embedded application.

11. The apparatus of claim 1, wherein the embedded interface comprises an iframe.

12. The apparatus of claim 1, wherein to receive access to the storage access API the apparatus at least is caused to:

receive a post message transmitted from the credential-based access component via a browser application to the user-facing application.

13. The apparatus of claim 1, wherein to cause re-loading of the embedded interface by accessing the storage access API, the apparatus is caused to:

retrieve, via the storage access API, a shared cookie associated with the embedded application, wherein the shared cookie is utilized to access the embedded application functionality via the embedded application.

14. The apparatus of claim 1, the apparatus further caused to:

upon re-loading of the embedded interface, cause rendering via the embedded interface of at least one embedded application interface element associated with the embedded application, wherein the at least one embedded application interface element is configured based at least in part on at least one embedded application data object retrieved via the embedded application functionality.

15. The apparatus of claim 14, wherein the user-facing application causes rendering of an integrated interface comprising a first sub-interface and a second sub-interface, the first sub-interface comprising the embedded interface associated with the embedded application, and the second sub-interface comprising at least one user-accessed application interface element associated with user-accessed application functionality of the user-accessed application.

16. A computer-implemented method comprising:

determining that a storage access API associated with an embedded application is not accessible via a user-facing application associated with a user-accessed application;

causing rendering, from within the user-facing application via an embedded interface, of a first user interface;

in response to user interaction with at least one interface element of the first user interface, causing rendering of a credential-based access component configured to receive user credentials associated with logging into the embedded application;

in response to submission of the user credentials, receiving, via the credential-based access component, authentication success data indicating successful authentication of the user credentials;

causing rendering, via the credential-based access component or a second credential-based access component, of a second user interface comprising at least one interface element configured to permission access to the storage access API;

receiving access to the storage access API in response to user input with the at least one interface element via the credential-based access component; and causing re-loading of the embedded interface by accessing the storage access API to provide access to an embedded application functionality.

17. The computer-implemented method of claim 16, wherein the second user interface causes, in response to second user input, rendering of a browser-prompted access request, wherein the access to the storage access API is received in response to third user input with the browser-prompted access request.

18. The computer-implemented method of claim 17, wherein the browser-prompted access request is browser-specific based at least in part on a browser application utilized to produce the credential-based access component.

19. The computer-implemented method of claim 17, further comprising:

determining that a login state associated with the embedded application is not logged in, causing rendering of the first user interface via the embedded interface is in response to a determination that the login state associated with the embedded application is not logged in and the storage access API associated with an embedded application is not accessible via the user-facing application.

20. A computer program product comprising at least one non-transitory computer-readable storage medium having computer program code stored thereon that, in execution with at least one processor, configures the at least one processor to:

determine that a storage access API associated with an embedded application is not accessible within a user-facing application associated with a user-accessed application via an iframe rendered by a wrapper associated with the embedded application and an embedded interface;

cause rendering, from within the user-facing application via the wrapper, of a first user interface;

cause rendering, via the wrapper, of a credential-based access component configured to receive user credentials associated with logging into the embedded application;

in response to submission of the user credentials, receive, via the credential-based access component, authentication success data indicating successful authentication of the user credentials;

cause rendering, via the credential-based access component or a second credential-based access component, of a second user interface comprising at least one interface element configured to permission access to the storage access API;

receive access to the storage access API in response to user input with the at least one interface element via the credential-based access component; and cause re-loading, via the wrapper, of the embedded interface by accessing the storage access API to provide access to an embedded application functionality.

\* \* \* \* \*